(12) United States Patent
Ponce de Leon et al.

(10) Patent No.: US 11,303,535 B1
(45) Date of Patent: Apr. 12, 2022

(54) INTERACTIVE CHAIN-DRIVEN NETWORK LAYOUT AUTHORING METHOD

(71) Applicant: PMA Technologies, LLC, Ann Arbor, MI (US)

(72) Inventors: Gui Ponce de Leon, Ann Arbor, MI (US); Vivek Puri, Schaumburg, IL (US)

(73) Assignee: PMA TECHNOLOGIES, LLC., Ann Arbor, MI (US)

( * ) Notice: Subject to any disclaimer, the term of this patent is extended or adjusted under 35 U.S.C. 154(b) by 1410 days.

(21) Appl. No.: 14/547,425

(22) Filed: Nov. 19, 2014

(51) Int. Cl.
| | |
|---|---|
| *H04L 12/24* | (2006.01) |
| *G06F 3/0484* | (2013.01) |
| *H04L 41/22* | (2022.01) |
| *G06F 3/04842* | (2022.01) |

(52) U.S. Cl.
CPC .......... *H04L 41/22* (2013.01); *G06F 3/04842* (2013.01)

(58) Field of Classification Search
CPC ............................. H04L 41/22; G06F 3/04842
See application file for complete search history.

(56) References Cited

U.S. PATENT DOCUMENTS

| | | | |
|---|---|---|---|
| 6,571,215 B1* | 5/2003 | Mahapatro | G06Q 10/06 705/7.12 |
| 8,400,467 B1* | 3/2013 | Ponce De Leon | G06Q 10/0631 345/619 |
| 2005/0004828 A1* | 1/2005 | deSilva | G06Q 10/06 705/7.16 |

\* cited by examiner

*Primary Examiner* — Jennifer N Welch
*Assistant Examiner* — Ashley M Fortino
(74) *Attorney, Agent, or Firm* — Carlson, Gaskey & Olds, P.C.

(57) ABSTRACT

A computer-implemented method for interactively authoring a layout of a network includes providing a network of activities, embedded nodes, milestones, benchmarks, and links between at least a portion of the activities, milestones, and benchmarks; identifying a plurality of activity clusters from the activities, each such activity cluster comprising a sequence of linked, contiguous activities in the network; and placing, as a group, the activities of each of the activity clusters on a display grid upon which the network is laid out.

20 Claims, 21 Drawing Sheets

*Figure 10*

INTERACTIVE CHAIN-DRIVEN NETWORK LAYOUT AUTHORING METHOD

COPYRIGHT NOTICE

Portions of this disclosure contain or may contain material that is subject to copyright protection. The copyright owner has no objection to the facsimile reproduction by anyone of the patent document of the patent disclosure as it appears in the Patent and Trademark Office patent file or records, but otherwise reserves all copyright rights whatsoever. Copyright 2014 PMA Technologies, LLC.

BACKGROUND

This disclosure relates to network layout authoring and, in particular, to an interactive, constraint-based network layout authoring method that utilizes logic chains in activity networks and that shifts the role of the scheduling application from merely network layout author or servitor to network layout collaborator.

SUMMARY

A computer-implemented method for interactively authoring a layout of a network according to an example of the disclosure includes, providing a network of activities, embedded nodes, milestones, benchmarks, and links between at least a portion of the activities, milestones, and benchmarks; identifying a plurality of activity clusters from the activities, each such activity cluster comprising a sequence of linked, contiguous activities in the network; and placing, as a group, the activities of each of the activity clusters on a display grid upon which the network is laid out.

In another aspect according to an example of the disclosure, a computer program, comprising software encoded in non-transitory computer-readable media, for interactively authoring a layout of a network, the software comprising instructions, operable when executed, to: provide a network of activities, embedded nodes, milestones, benchmarks, and links between at least a portion of the activities, milestones, and benchmarks; identify a plurality of activity clusters from the activities, each such activity cluster comprising a sequence of linked, contiguous activities in the network; and place, as a group, the activities of each of the activity clusters on a display grid upon which the network is laid out.

In another aspect according to an example of the disclosure, a system for interactively authoring a layout of a network includes, a user interface; and at least one processor configured to: provide a network of activities, embedded nodes, milestones, benchmarks, and links between at least a portion of the activities, milestones, and benchmarks; identify a plurality of activity clusters from the activities, each such activity cluster comprising a sequence of linked, contiguous activities in the network; and place, as a group, the activities of each of the activity clusters on a display grid upon which the network is laid out.

BRIEF DESCRIPTION OF THE DRAWINGS

The interactive chain-driven network layout authoring method may be better understood with reference to the following drawings and descriptions. The components in the figures are not necessarily to scale, emphasis instead being placed upon illustrating the principles of the invention. In the figures, like referenced numerals designate corresponding parts throughout the different views.

FIG. 10 shows an example Layout Manager interface with the Layout view.

DETAILED DESCRIPTION

Figure 1:
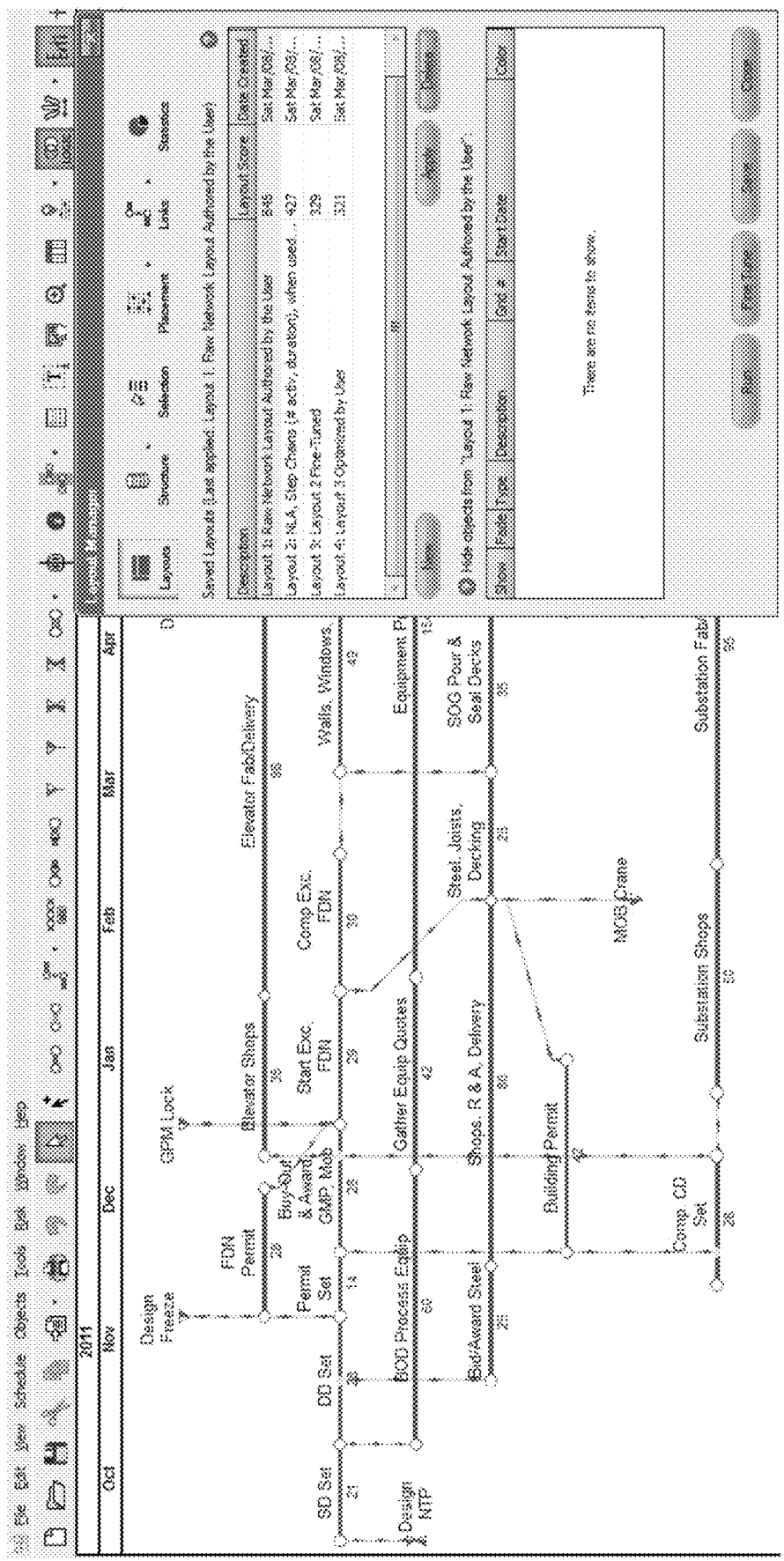
FIG. 1 illustrates an example GUI for an interactive network layout authoring application.

The graphical path method (GPM®) is a network scheduling technique that synchronously builds/calculates/displays a network and schedule as a user manipulates and incrementally authors a layout of activities, links, and other network objects. A synchronous interface is enabled by an objectbase vs. a database architecture. In contrast, the critical path method (CPM) is a scheduling technique advocating that planning precede scheduling. CPM applications are premised on databases that rely on non-synchronous, standby calculating engines, and that require a separately built network as input. Further, CPM applications author a network layout on the whole, often with a disconcerting result: a Gantt chart vs. a network.

CPM applications that rely on waterfall Gantt chart printouts fail to communicate the project plan or schedule effectively. Even if augmented with links, Gantt charts are barely discernible. Reliance on Gantt charts to visualize a schedule is dated technology and is incompatible with touch computing and other digital trends that favor mobile devices. The following definitions may be useful in understanding this disclosure:

activity: primary network object denoting a task that must be performed (with duration and possibly assigned resources and cost), a time-consuming restraint to an activity or a milestone, or a delay denoting the adverse effect on timing from what was anticipated.

activity-on-node diagram: rheonomic network that places activities on the nodes of the network.

benchmark: reference network object denoting a fixed start or completion event (occurs in an instant) that has zero total float, and that is used to model an overarching milestone or a contractual deadline.

breadth-first search: search strategy in a graph that involves enqueueing an object and gaining access to the objects that neighbor the enqueued object. In networks, a common breadth-first search algorithm calculates the number of predecessors for each object; traverses the network by enqueueing objects with predecessor count=0; when dequeuing a labeled object, the predecessor count of its successors is reduced by 1.

calendar timeline: display grid (or canvas) integer X coordinate designating dates on the calendar, which causes object start and/or finish times to be expressed as calendar dates.

canvas/display grid: two-dimensional plane upon which the network is laid out.

canvas value: for an X-Y coordinate, canvas value=0 (false) if the X-Y position is empty, or canvas value=1 (true) if the X-Y position is occupied by an activity, a milestone, a benchmark, or a link H leg.

code chain: logic chain comprising activities with a common filter code. Filter codes organize the schedule into groups for the purpose of filtering, rolling up, and summarizing activities, milestones, and benchmarks according to their common filter codes.

drift: extent an activity may gain schedule (e.g., shift backwards to an earlier position) and not force an earlier starting time for the schedule or an earlier interim release time.

early (late) times: earliest (latest) an activity may start/finish or a milestone may occur, as determined by the CPM forward pass (backward pass) and by the GPM® algorithms.

embedded node: event intermediate of, or right on, the start or finish node of an activity, through which the activity is linked to another activity, a milestone, or a benchmark.

float: extent a positive-drift activity may be delayed beyond planned dates and not extend project completion. Float equals total float for activities on early times.

float chain: logic chain comprising activities of identical total float.

FS string: float chain of three or more FS-linked activities, in which every intermediate activity has only one predecessor activity and only one successor activity.

gap: for two linked objects, extent the predecessor may be delayed and not impact the successor, and the successor may gain schedule and not impact the predecessor.

graphical path method: network method premised on objectbase applications that synchronously build/calculate/display the network and schedule as a user manipulates network objects. Allowing activities to be scheduled on planned dates (without giving up the ability to drift back), GPM® calculates gaps, which are used to calculate late dates and float attributes. Total floats are calculated for completed activities, which identifies the as-built critical path.

lane: layout technique for visually organizing network objects into horizontal lanes according to specified criteria. The opposite of a lane layout is a global layout.

layout: X-Y coordinates of every activity, milestone, benchmark, and the routing of every link.

layout score: sum link score plus penalties for every activity/activity overlap, activity/event overlap, activity/H link overlap, and every activity or event and link H leg overlap.

link: primary network object drawn as a directed edge connecting two activities, an activity and a milestone or benchmark, two milestones, or a milestone and benchmark.

link score: cumulative penalty for object crossings, link leg overlays, and link V/D leg length.

logic chain: any sequence of linked, contiguous activities through a network.

logic diagramming method (LDM): logic-timeline or logic-step network that uses bars from start to finish nodes to represent the activities and that links activities through their start or finish nodes or embedded nodes. LDM networks model the four types of PDM logic commonly allowed in CPM networks when using precedence diagraming method notation.

logic index: number of activity-to-activity links as a ratio to the number of activities.

logic step: set as 1 for the source activity or activities, and for every other activity, determined as one logic step higher than the highest logic step of all its predecessor activities.

logic-step diagram: scleronomic LDM network that arranges the activities (and therefore benchmarks and linked milestones) on the X coordinate according to logic steps.

logic-timeline diagram: rheonomic LDM network that arranges activities, delays, milestones, and benchmarks on the X coordinate according to calendar dates or ordinal times.

milestone: reference network object denoting a start or completion event (occurs in an instant) that, if linked and unrestrained by an artificial date constraint, is controlled by the start or finish time, respectively, of its linked activities.

network, activity network: flow graph of the schedule comprising rule-encoded, algorithmic activities (possibly including delay-modeling activities), embedded nodes, milestones, and benchmarks, which are linked by designated predecessor-successor links.

network object: activity, link, embedded node, milestone, or benchmark.

object score: average link score across all links merging into and emanating from a dated object, e.g., an activity, a milestone, or a benchmark.

objectbase: collection of rule-encapsulating objects that, in response to manipulation by the user of an object(s), inherently interact via message passing to cause recalculated attributes for the manipulated objects and other objects affected by the manipulation, including links connecting the manipulated and impacted objects.

ordinal timeline: X coordinate designates integer times on the timeline, which means that object start times measure units of time from the starting time.

orthogonal link: drawn with alternate H/V legs, e.g., an HV link, a VH link, a VHV link, etc.

paired links: as between two linked activities, logic pattern where the predecessor and successor are connected by two or more links. Logic pattern cases involving two links include SS and FF links, FS and SS links, FS and FF links, or FS and SF links.

PDM logic: precedence diagramming method notation for networks that, in addition to the common finish-to-start (FS) logic, models start-to-start (SS), finish-to-finish (FF), and start-to-finish (SF) logic.

period: coarser time unit that groups consecutive time units along the timeline, e.g., days are grouped in weeks, weeks in months, months in quarters, etc.

period density: number of activities scheduled during the period at issue. The highest period density is the $100^{th}$ percentile period density.

planned dates: in GPM®, physically manipulated times—between early and late times—that do not replace early times and generate drift, thereby preserving total float.

polyline link: drawn with alternate H or V and D legs, e.g., a VD link, an HD link, a VDV link, a VDH link, etc.

redundant link: link connecting activity A to successor C that can never drive the successor because another predecessor B to the successor C, which predecessor B is also a successor to activity A, always drives the common successor C; also, an SS on FS/SS paired links, an FF on FS/FF paired links, an SF on FS/SF paired links, an SF on SS/SF paired links, and an SF on FF/SF paired links.

rheonomic network: flow graph with a time-dependent layout; also referred to as a time-scaled network. The opposite is a scleronomic network that lays out activities without considering time as a variable.

source: start milestone or start benchmark whose time of occurrence, or activity whose start time, designates the starting event for the schedule, and that, by definition, has no predecessors.

step chain: logic chain comprising activities on consecutive logic steps.

sum link score: aggregate of the link scores for all links existing in the network.

synchronous: interface that in real time, in response to, and during manipulation by the user of network objects along the X coordinate, recalculates and refreshes the display of the schedule in its instant state.

timeline: partition of the X coordinate in a network diagram into time units that determines the X coordinates of activities—based on their start and finish times—and the X coordinates of milestones and benchmarks—based on their calculated or designated occurrence times.

timeline density: number of activities as a ratio to the number of periods from the project start date to the project completion date.

total float: extent an activity may be delayed beyond early dates and not delay overall completion; also, combined extent an activity on planned dates may be delayed and gain schedule and neither delay overall completion nor force an earlier project start or interim release date, respectively.

Y grid: partition of a network diagram into equidistant horizontal layers or grids that determine the position of non-overlapping objects based on their Y coordinates.

One aspect that GPM® differs from CPM is that the user, interacting with the GPM® application, authors the network layout by manipulating network objects (either touching the computer screen or using the keyboard/mouse, or both). With the schedule displayed as a logic-timeline network, stakeholders can better visualize the logical flow and work with more activities on the screen than is possible with a Gantt chart. However, limiting the GPM® application to the role of network layout servitor makes the user solely responsible for network layout. This becomes a hindrance when working with complex schedules and when converting an imported CPM schedule file into a GPM® network. Disclosed is a method that transforms the GPM® application from mere layout servitor to layout author/collaborator that significantly enhances the efficacy of GPM® planning/scheduling.

Computer-implemented examples of the present disclosure may be referred to as a network layout authoring (NLA) application or "layout engine." In one embodiment, the NLA application functions as collaborator with the user in that the user approximates the layout of activities, milestones, benchmarks, associated links (and embedded nodes), texts, and images, leaves the automated layout engine on or turns it on at will, and specifies the visual organization of the network. When invoked, the NLA application converts the user visual-organization specifications into layout parameters or constraints (stated in terms of a two-dimensional model), and authors the layout of the objects by simulating feasible options and virtually manipulating objects on the whole or selectively according to the user mental mapping, object search, layout, and aesthetic constraints.

In another embodiment, the NLA application enables GPM®/CPM interoperability by authoring the layout of the cluttered network that results when a GPM® application displays an imported CPM schedule as a logic-timeline network. The imported schedule may consist of a CPM software file or a spreadsheet file of activities, embedded nodes, milestones, benchmarks, and links. The ability to visually analyze a CPM schedule in a GPM® application and to return the schedule to the CPM application is a useful protocol as compared to working with Gantt charts.

FIG. 1 shows an example graphical user interface (GUI) for an NLA application. The interface includes: 1) GPM® application toolbars and menus that provide methods and supporting functions to create the schedule, 2) a GPM® schedule created and manually authored by the user, and 3) an example of the Layout Manager. These interface components may be implemented in combination or further divided into subcomponents.

Figure 2:
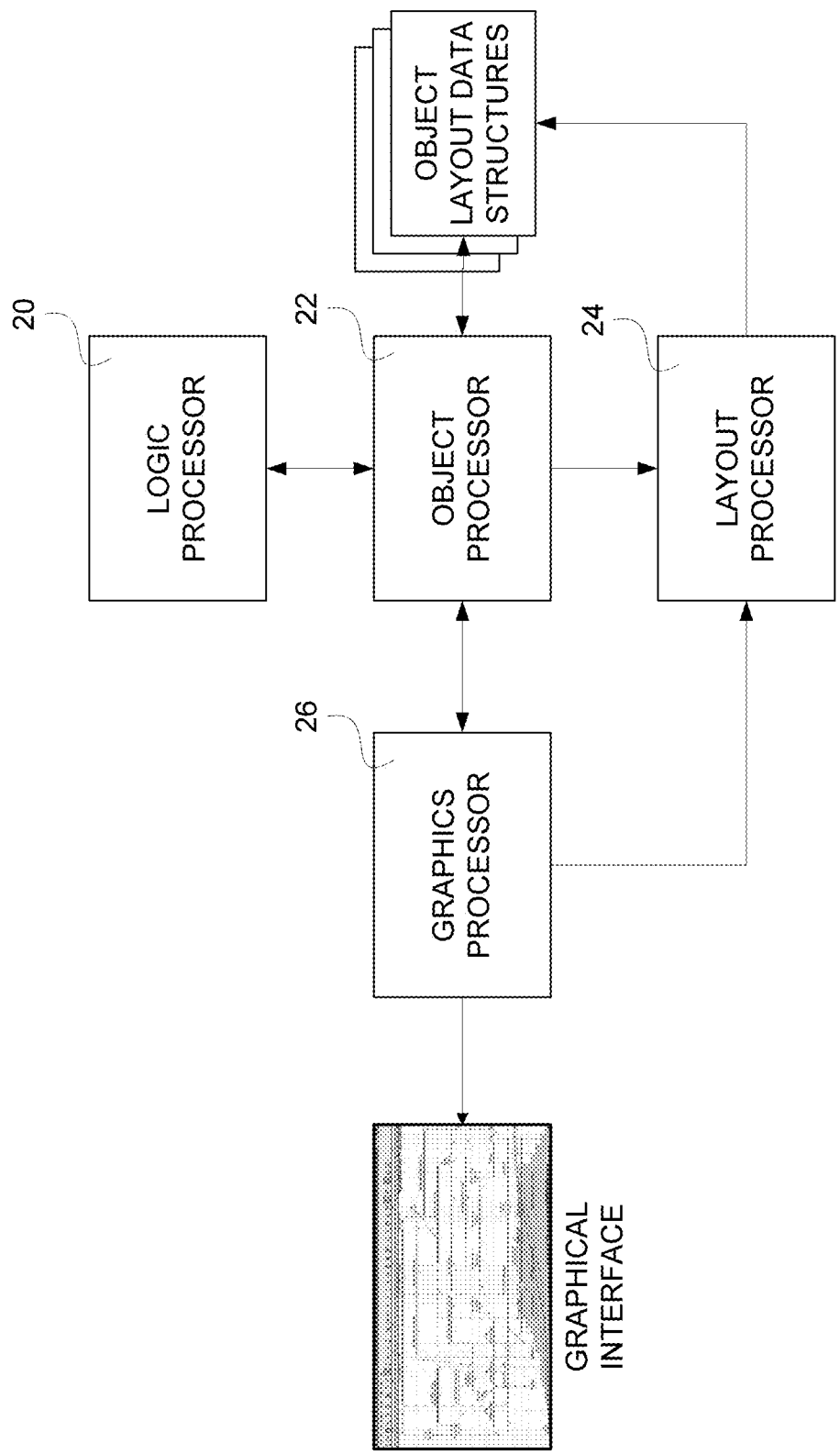
FIG. 2 is a block diagram of an example interactive network layout authoring application.

An example NLA application is shown in FIG. 2 and includes a logic processor 20, an object processor 22, a layout processor 24, and a graphics processor 26. Each processor 20, 22, 24, 26 may include software, hardware, or both, and may be further subdivided or combined in one or more processors or modules. The application may be implemented in one or more computer programs executing on one or more programmable systems comprising at least one processor and at least one data storage system. Each program may be implemented in any desired computer language to communicate with a computer system. The NLA application may also include a computing network that enables the processors 20, 22, 24, 26 and/or other computing devices to communicate and exchange data, including any communication method by which information may travel between computing devices. The network may include one or more of a wireless or wired network, a local or wide area network, a direct connection such as through a Universal Serial Bus port, and the set of interconnected networks that make up the Internet, an Intranet, or other distributed computing network.

Figure 3:
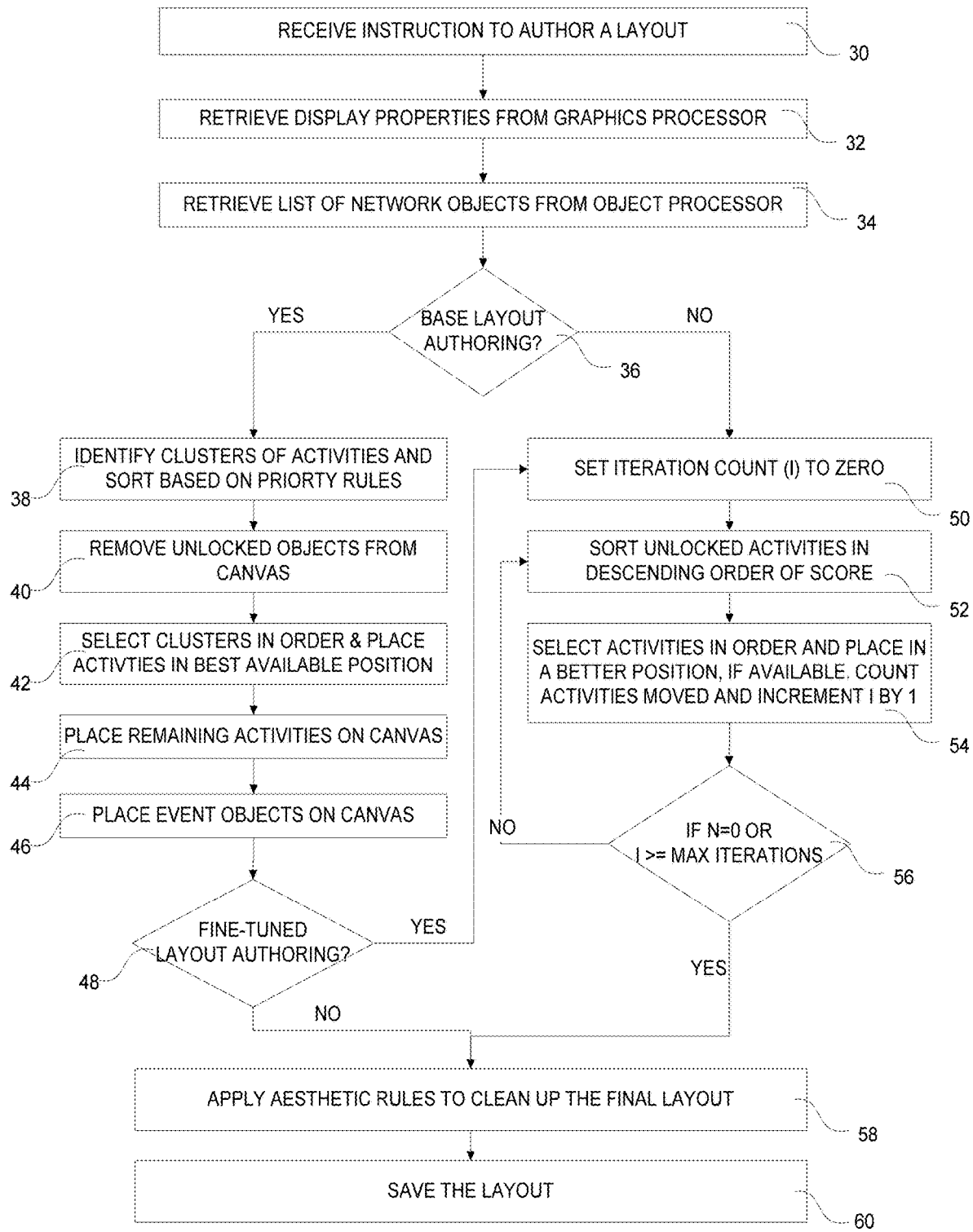
FIG. 3 shows a flow chart of an example of the operation of the object processor.

FIG. 3 illustrates a flow diagram of the layout processor 24. The process begins at 30 with the layout processor 24 receiving instructions from the user to author and/or fine-tune a layout. The layout processor 24 retrieves the display properties from the graphics processor 26 and object list from the object processor 22. If the user requested a base layout, selection rules are used to cluster activities in the network and to sort the clusters. Unlocked objects are removed from the canvas. The layout processor 24 selects objects from the sorted clusters, identifies the best locations, and places the objects back on the canvas, along with modifying link geometries to minimize link scores. Once all clusters are placed, remaining activities are placed one by one on their best locations, followed by milestones and benchmarks. If the user requested a fine-tuned layout, the layout processor 24 sorts unlocked objects on the canvas based on their object scores. The layout processor 24 searches for better Y grids, and where found, moves objects to new Y coordinates, along with modifying link geometries to minimize link scores. Once an iteration completes, the layout processor 24 may repeat steps 52, 54, and 56, until the maximum iteration count is exceeded or no better location is found for any object at all. The layout processor 24 improves the layout of the network using aesthetic rules defined by the user at 58 and saves the layout at 60.

Figure 4:
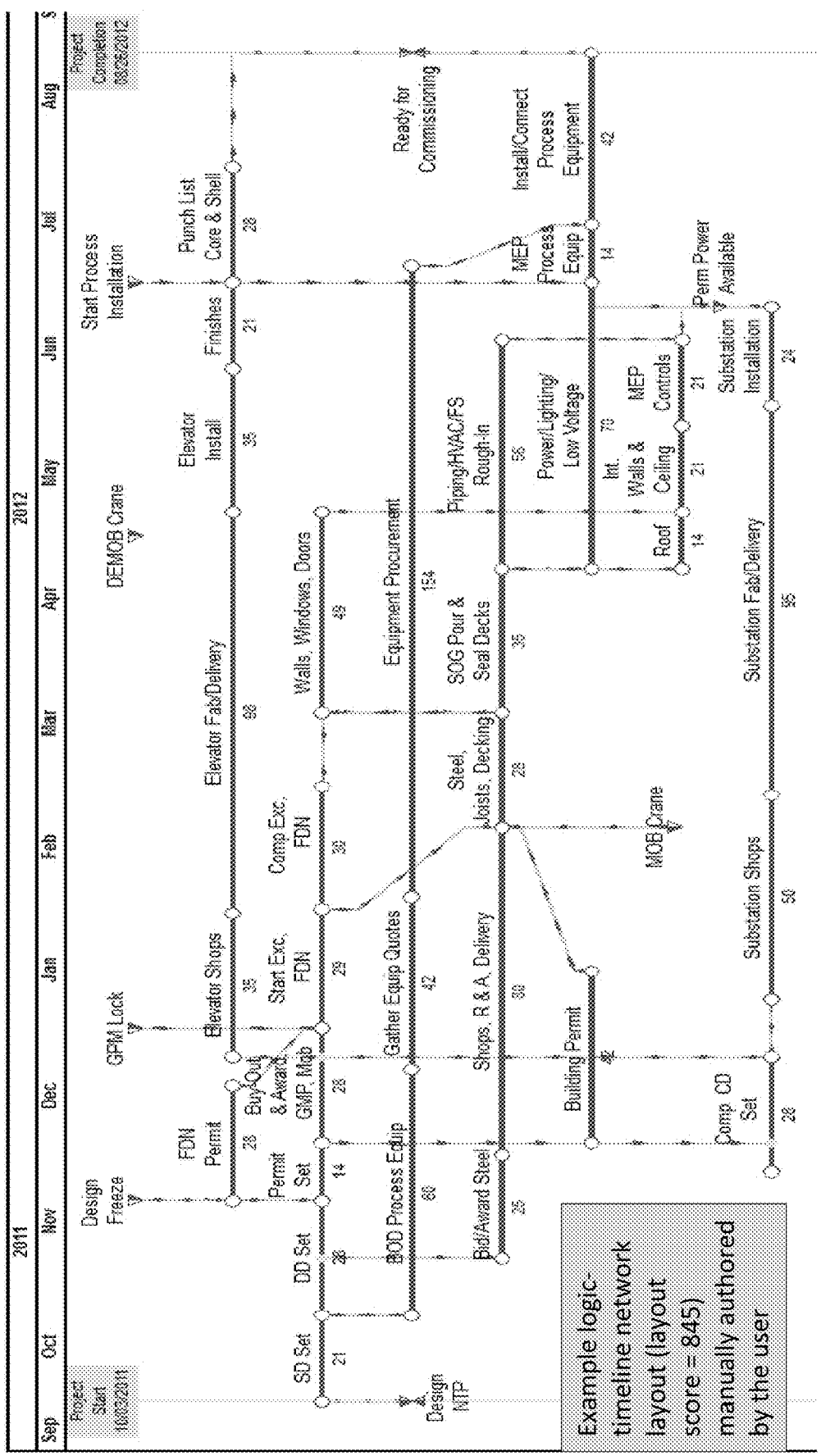
FIG. 4 shows an example logic-timeline network manual layout authored by the user.

An example of a schedule generated using a GPM® application and manually authored by the user is shown in FIG. 4. Once the GPM® schedule is fully developed (network topology and timeline), further attempts to manipulate the network layout may ensue as the skill/patience of the planner permit.

Figure 5:
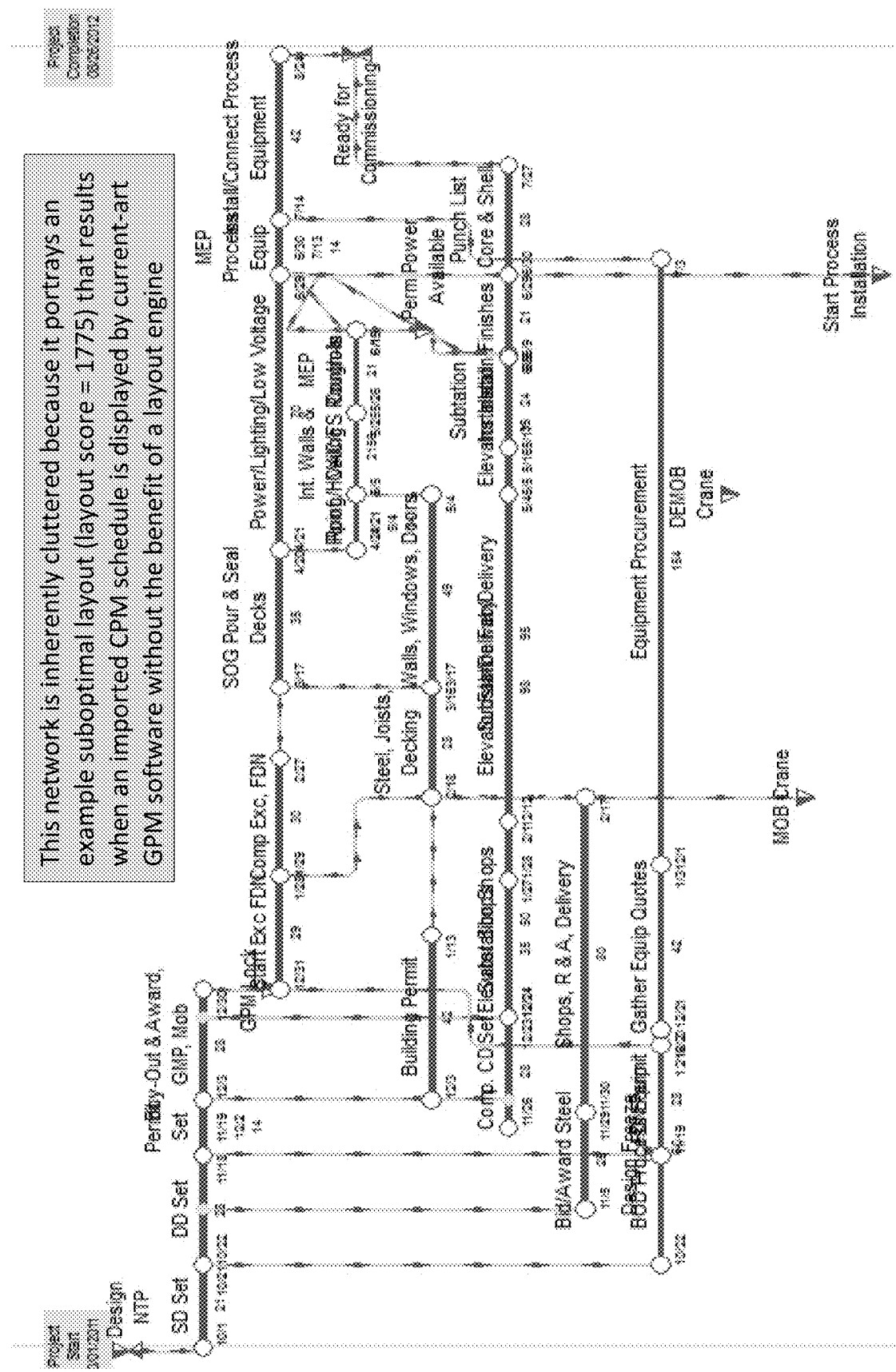
FIG. 5 shows an example cluttered layout of a CPM network imported by a GPM® application.

An example of a logic-timeline schedule generated using CPM software and that is imported into a GPM® application—without the benefit of a layout engine—is shown in FIG. 5. Without a network layout engine, the GPM® software generates a cluttered network layout, i.e., multiple activities and/or links overlay on the same grid. Such a cluttered, suboptimal layout places the user in the untenable position of having to manually generate a rational layout from a somewhat undecipherable network. Except for simple schedules, complete reliance on the planner/user to manipulate and manually author the layout of an imported CPM schedule is an arduous process that can effectively work to discourage GPM®/CPM interoperability.

Automating the layout of a network utilizes algorithmic strategies to improve the rationality of the network without altering the topology or object X coordinates. Constrained graph layout authoring methods applied to scleronomic layouts based on integer X-Y coordinates encompass the technology most commonly used by network layout engines. In constrained graph layout, the layout engine accepts the network topology defined as 1) the arrangement of objects and links that connect the objects, and 2) a set of layout constraints over integer X and Y positions. The layout engine, commonly deploying a breadth-first search algorithm, is responsible for finding all feasible Y and X coordinates that satisfy the layout constraints for every object, object by object, evaluating routing options for links based on aesthetic constraints, and virtually manipulating objects into X-Y coordinates that best meet aesthetics constraints. Different graph layout engines allow different classes of constraints and may also embody different layout algorithms and aesthetic criteria. The recommended network layout authoring strategy is to select the set of object search, layout, and aesthetic constraints that work best for the practical application and for the particular network arrangement of activities and links.

Figure 6:
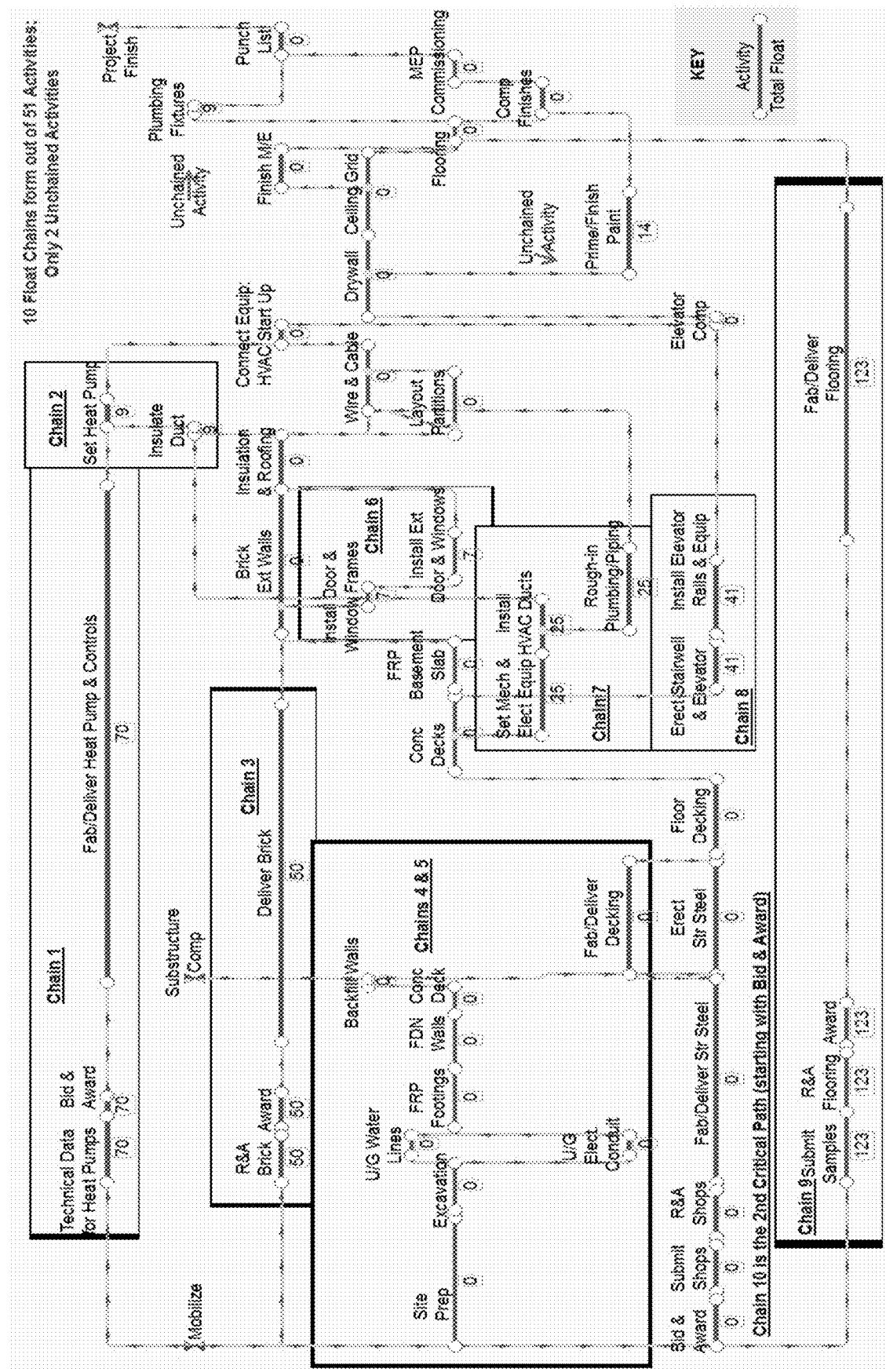
FIG. 6 shows an example logic-timeline network highlighting 10 float chains.

In the present disclosure, when authoring the layout of a network from an empty display grid, an example embodiment may proceed by enqueueing activity clusters rather than solely based on activity-by-activity search strategies. Relative to activity clusters in the present disclosure, layout authoring utilizes logic chains that form in activity networks stemming from activity-to-activity logic and common activity attributes. Chain-based layout authoring strategies inherently trend to fewer cycles to complete the layout of a network (when starting from an empty display grid), an important consideration as it is common for project schedules to contain hundreds or even thousands of activities. In the network in FIG. 6, if activity search/placement is based on float chains, the enqueueing algorithm in the present disclosure identifies and places 49 of the 51 activities in the 10 float chains that form in the network (the 10 float chains are highlighted in FIG. 6). All activities on each chain, when a chain is selected, are placed as a group, leaving only 2 activities to be placed individually. In contrast, for the network in FIG. 6, any application that is based on current art solely pursues an activity-by-activity layout strategy that manipulates one activity at a time until all 51 activities are laid out.

In the present disclosure, network layout authoring may start from an empty canvas (base-layout mode) or be limited to improving an existing layout (fine-tuning mode). In an example embodiment, only the base-layout algorithms are invoked to author a network layout. In another example embodiment, base layout and fine-tuning algorithms are applied sequentially, in either order. In yet another example, layout fine-tuning is directly applied on an starting global or lane layout. Base-layout authoring, except for mental mapping constraints, is not constrained by the starting layout, and authoring is geared to minimizing the sum of link scores for every object when placed on the display grid.

In any embodiment, object overlapping is precluded by foregoing any position with current canvas value=1, and a link penalty concept is used to optimize link routing. Link penalties recognize: 1) link/activity crossings; 2) link/link crossings; 3) the link contains an H or a D leg spanning≥50% of the gap; 4) the link V leg (if any) overlays another link V leg flowing in the opposite direction (i.e., opposing V legs); 5) over 50% of the link V leg (if any) overlays another link V leg flowing in the same direction (i.e., coinciding V legs); 6) over 50% of the link H leg (if any) overlays another link H leg; and 7) every time the link crosses a grid, excluding intermediate grids introduced by the NLA application. In fine-tuning mode, network layout is geared to improving activity scores and minimizing object crossings, object overlays, and the length of link V/D legs.

The present disclosure recognizes that project schedules have extended lifecycles, involving the initial baseline and schedule updates. As updates are generated, it is helpful for the layout of the current update to map to the baseline or a prior update to preserve the mental image the user has of the layout. The present disclosure relies on lanes and object locking to preserve the user's mental mapping. In a lane layout, the NLA application groups network objects into lanes based on user criteria. In a global layout, objects may be locked by the user perhaps to prevent the layout engine from manipulating completed/in-progress activities or activities that the user prefers remain in their layout. An additional mental mapping scheme allows the layout engine to lock objects based on an objective constraint. In an example embodiment, an activity is locked if its score is equal to or below an aspirational seed score indicating a tidy layout. Because the Y-grid arrangement may vary as the layout progresses, locked grids (manually or seeded) are suggested positions, and object locking is a relative constraint.

In an example embodiment, the user and NLA application can collaborate interactively. The user, by modifying constraints, runs several trial layouts, and investigates layout aesthetics from the literally hundreds of possible layouts that can be generated. As each trial layout run completes, the user reviews the layout, compares layout scores, ascertains the sensitivity of the network to constraint variations, and proceeds on until it is apparent that a near-optimal layout has been generated. Interactive, network layout trials are not feasible in current-art scheduling applications as 1) the user has minimal options to select layout authoring constraints, and 2) the interface does not save any prior layout and thus does not allow the user to toggle between multiple network layouts.

In another example embodiment, the application may lay out the network either in a logic-timeline or logic-step network diagram format, and toggle between formats. In general, a logic-step network will display more activities and links on a computer screen than the alternate logic-timeline network. Moreover, while short-duration activities (e.g., durations at or below the 2nd percentile duration) often graph as miniscule activities in a rheonomic diagram possibly causing untidy layouts, no such aesthetic complications arise in a logic-step network as all activities are equally dimensioned, regardless of their durations. A scleronomic logic-step network that synchronously displays dates, gaps, drifts/floats, and/or total floats as the user manipulates objects in the X dimension portrays a helpful supporting working model for what-if schedule analysis, including compressing/extending the schedule.

Figure 8:
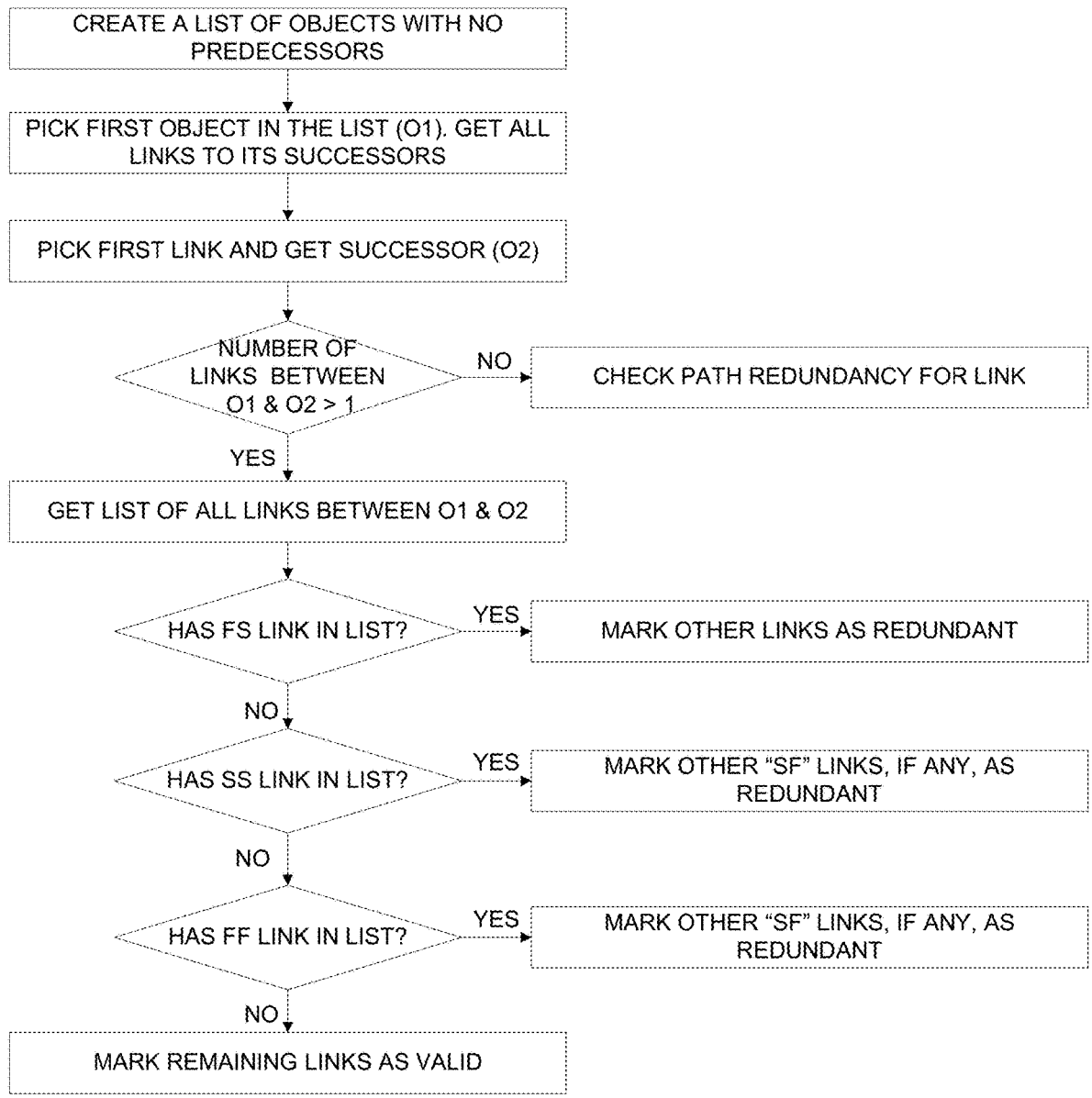
FIG. 8 shows an example redundant link labeling algorithm for paired links.
Figure 9:
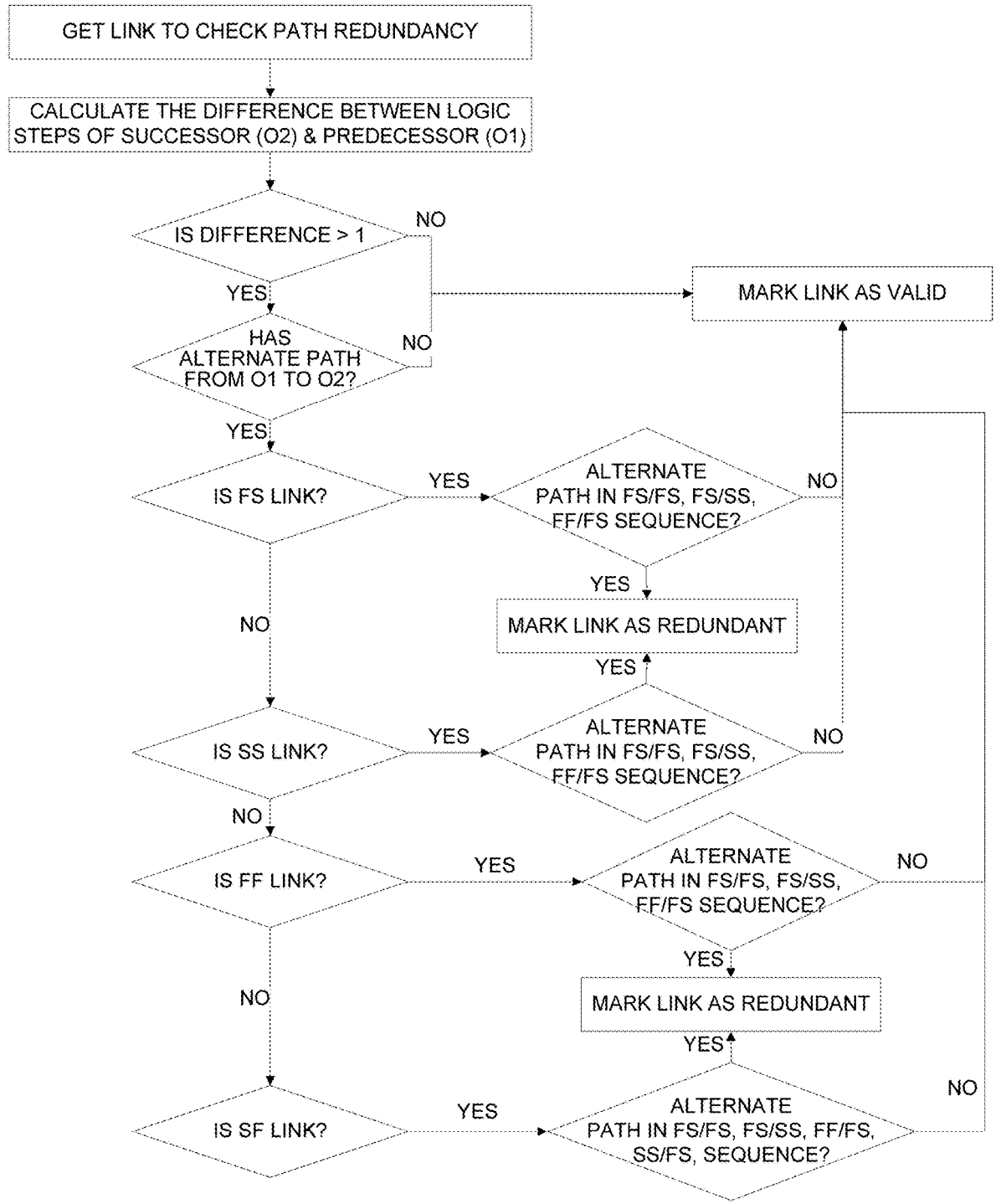
FIG. 9 shows an example redundant link labeling algorithm for finish-to-start links, start-to-start links, finish-to-finish links, and start-to-finish links.

In yet another example embodiment, redundant links may be identified and omitted or hidden from, or faded in, the authored network layout. Redundant links are superfluous to determining the X coordinates of activities and run cross purpose to the goal of minimizing object crossings, particularly for CPM schedules that are imported into a GPM® application. In addition to SS, FF, and SF logic on paired links that include an FS link, and SF logic on paired links that include an SS or FF link, the redundant link algorithm in the present disclosure identifies redundancies through a breadth-first search algorithm that recognizes that a non-paired FS, SS, FF, or SF link may be redundant if the two linked activities are not on consecutive logic steps. In the network in FIG. 7, two redundant links remain connecting activities A1 and A3 and activities A6 and A15. FIGS. 8 and 9 convey the two redundant link search algorithms embedded in an embodiment of the present disclosure. As an added feature, the layout engine may delete, omit, or fade redundant links as well as merely omit from the display links with gaps greater than a threshold.

Figure 10:
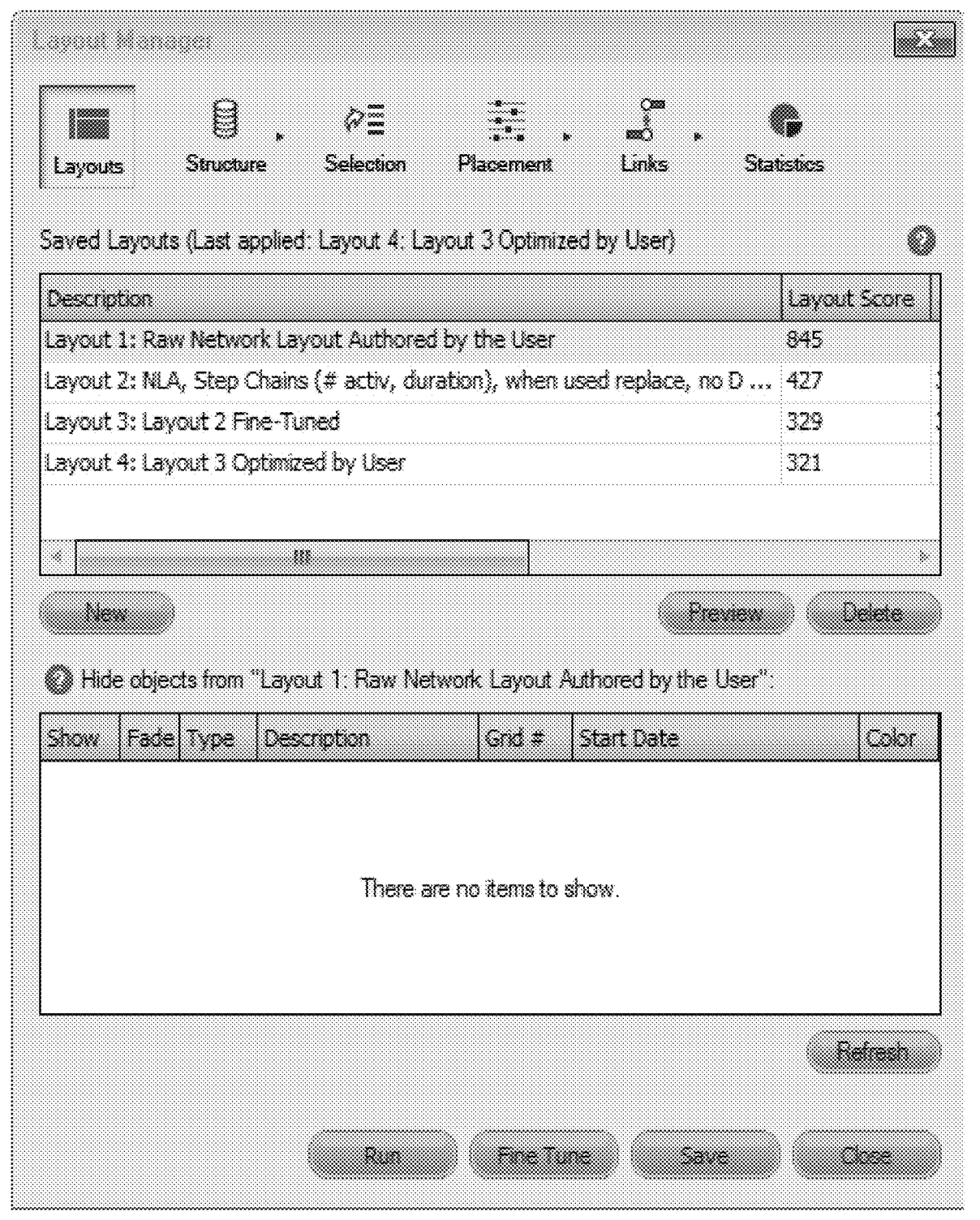

FIG. 10 shows an example interface for a Layout Manager used to capture the user visual organization specifications, display saved layouts, and toggle between saved layouts to re-author a prior layout with a different set of constraints or to review the specific constraints used on a prior layout (perhaps when further investigating layout strategies). Along the top of the interface, tabs/views identify categories of network layout specifications from which the NLA application generates mental mapping, object search, layout, and aesthetic constraints, as well as resulting network layout statistics. The different views are: Layout, Structure, Selection, Placement, Links, and Statistics. The selected view is identified through a depressed tab.

On selecting a tab, the example interface of the Layout Manager updates its view to allow the applicable visual organization options. The Layout interface allows saving user-authored layouts, including any manual fine-tuning done by the user following an automated layout, as well any layout authored or fine-tuned by the layout engine. In the example embodiment, the Layout Manager, through its distinct views and the associated options, provides a unified, non-modal interface that incorporates all criteria necessary to algorithmically automate authoring the layout of the network, and is simple, intuitive and convenient.

Figure 11:
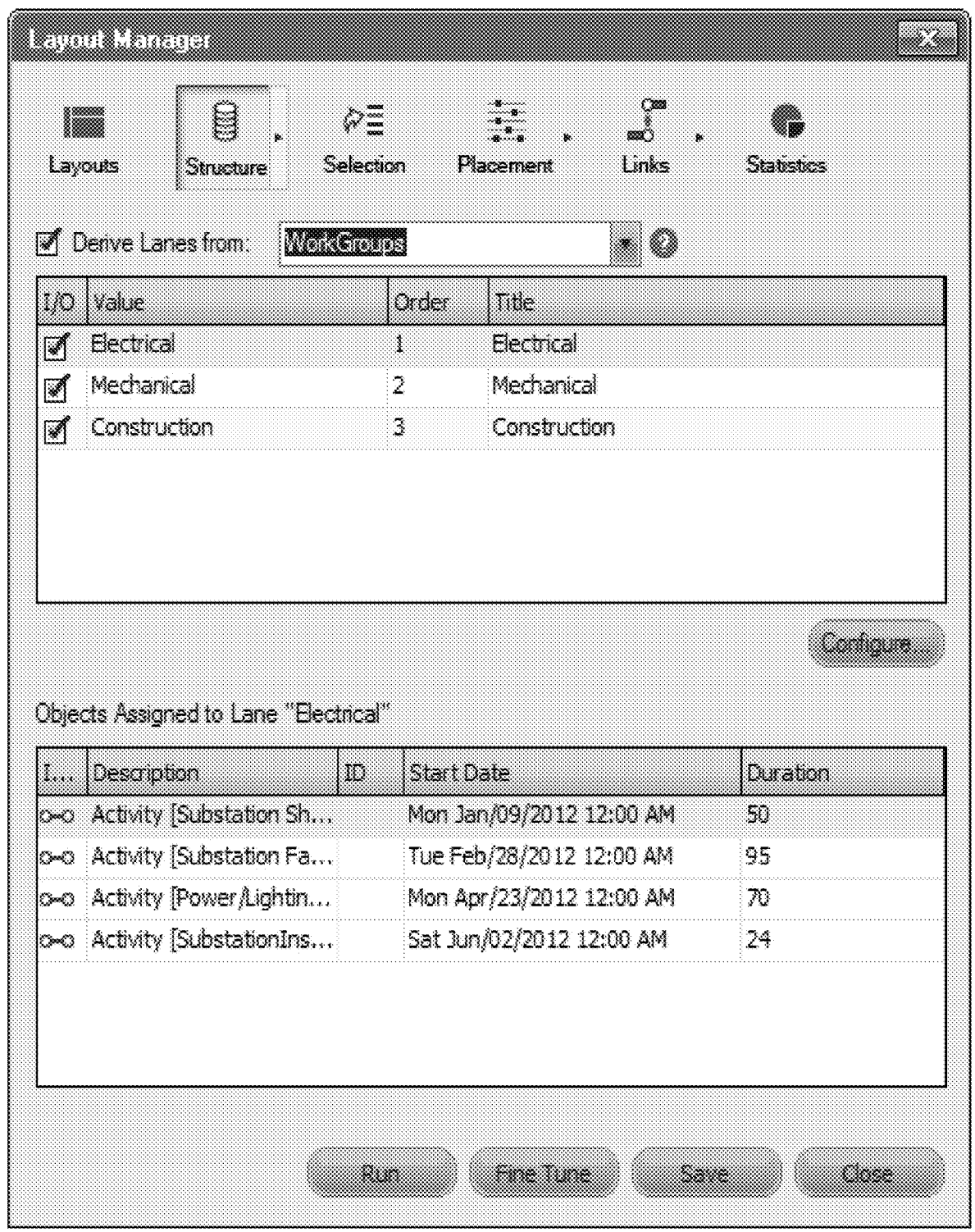
FIG. 11 shows an example Layout Manager interface with the Structure view.

FIG. 11 shows an example interface of the Layout Manager with the Structure view. This example interface accommodates lane and object-locking mental mapping strategies through a common menu alongside the Structure icon. The Lanes view, which is the default interface in the example, is segmented into two lists and is geared to using pre-existing, automated lanes or to converting a global layout to lanes. In the latter case, the user provides the grouping code that drives lanes and locking options are deactivated. When a valid code is input in the menu field provided, the Code Values list is populated with all values for that code, and the user has the option to select all code values or those highlighted, and to sort the list to achieve the desired lane sequence. A default object color (which the user can customize) for activities with total float values above the specified criticality threshold is displayed for each lane. Also shown is the default grid shade scheme, but the user may specify any pattern of shades/colors. The bottom of the interface lists activities, milestones, and benchmarks included in each lane (when highlighted), and a vertical scroll bar allows a preview of all lanes.

In the example interface, when Locking is activated, the top window displays all objects in the schedule. As objects are manually locked, they populate the lower list. The seed (score threshold) is provided in the 'Lock all' input field. When provided, all objects meeting the threshold populate the lower list as locked objects, and the number of seeded activities is displayed alongside the user-provided seed score. The example interface allows locked objects to be spotlighted on the canvas. In the All Objects list, a checkmark in the locked column indicates locked objects. This feature allows an experienced user to fine-tune seed scores. The Save feature allows the user to select alternate locking schemes and compare the resulting layouts.

The example interface (manually-locked and seeded grids) is deactivated if the network layout is to be converted from a global layout to a lane layout or vice-versa. Objects in a network that remains in a global or lane layout maybe locked by the user and the application.

Figure 12:
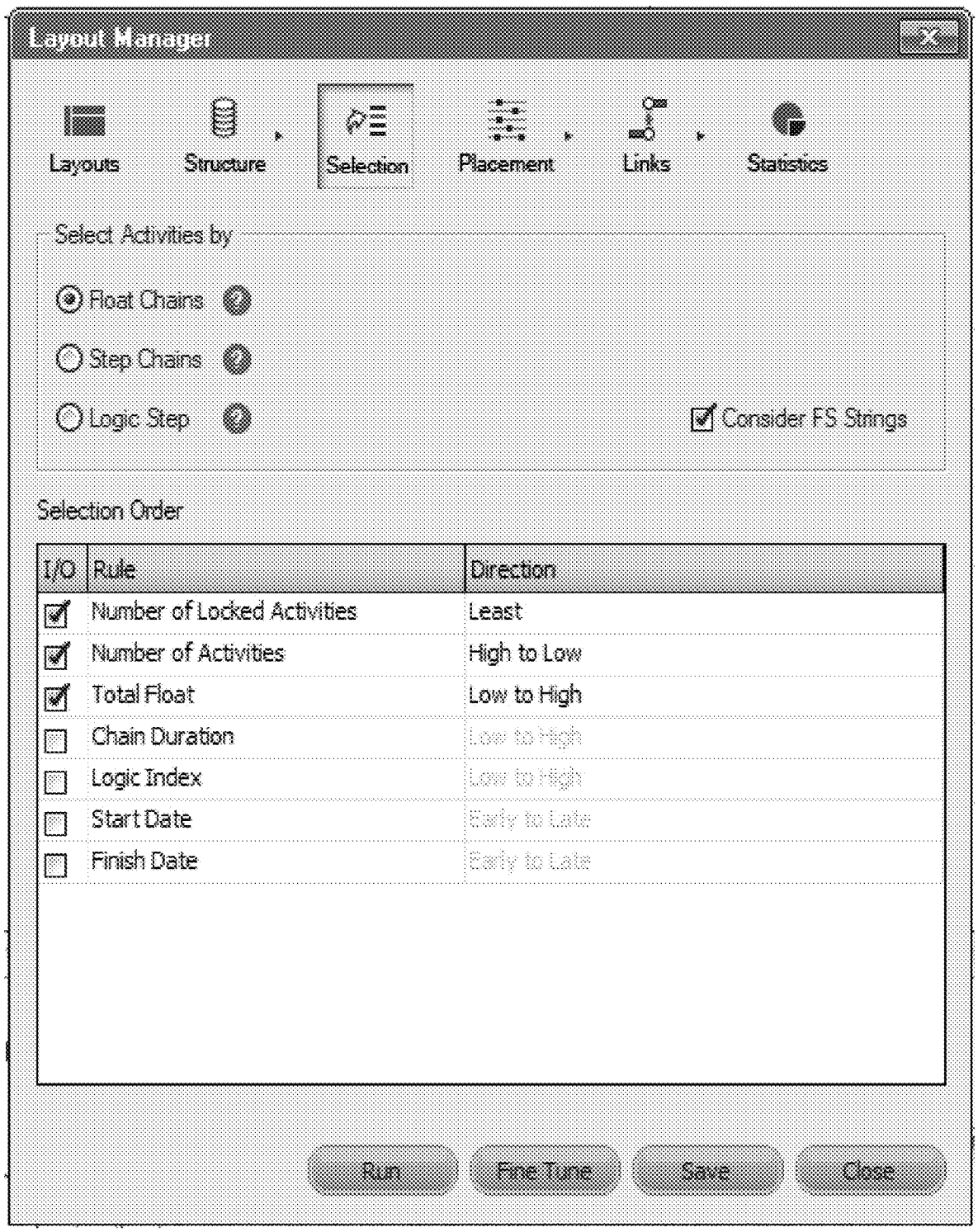
FIG. 12 shows an example Layout Manager interface with the Selection view.

FIG. 12 shows an example interface of the Layout Manager with the Selection view. The Selection view is used to accept the search strategy, and the example interface offers the capability to toggle among search strategies. In the example interface, two types of logic chains are considered for enqueueing clusters of objects: float chains and step chains. In another example embodiment, code chains may also be considered to cluster activities. When float chains are selected as the search strategy, if FS strings are considered, they may be placed along with other float chains or after all float chains are placed instead. Priority constraints provided to enqueue float chains include: number of activities (i.e., most or fewest activities); if a tie arises, chain duration; if still a tie, chain logic index; if still a tie, and the chain is a float chain, total float; if still a tie, chain start date; if still a tie, number of locked activities; if still a tie, chain finish date; and, if still a tie, an internal tie-breaking rule is used. Chain logic index expresses the number of predecessors for all activities in relation to the number of activities. Similar priority constraints are provided to enqueue step chains for placement. Priority constraints can be sorted from high to low and vice versa and can be activated/deactivated.

In the example embodiment, activity-by-activity layout is an alternative to cluster strategies and a necessary step after all logic chains are placed. The Selection view allows activities to be enqueued based on: the activity that is a successor to the previously placed activity; absent a match, the activity with the most placed predecessors and successors; if the prior constraint results in a tie, based on earliest start date; if still a tie, based on duration; and if still a tie, based on float attributes. Priority constraints can be sorted and activated/deactivated.

Figure 13:
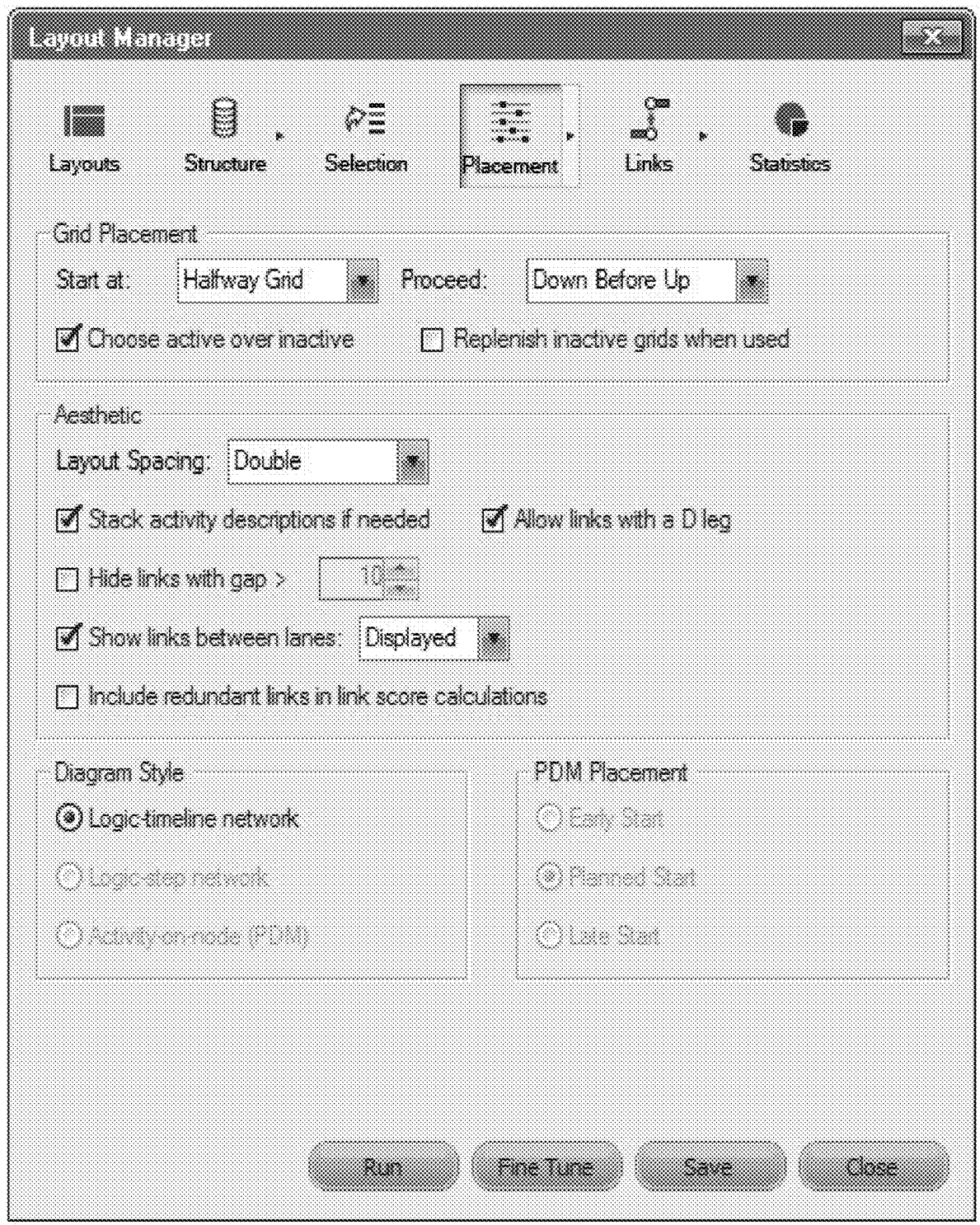
FIG. 13 shows an example of the Layout Manager with the Placement view.

FIG. 13 shows an example interface of the Layout Manager with the Placement tab and the default view, Rules. In this example interface, "Grid Placement" options drive the visual organization of the layout, and fields include: 1) starting grid: halfway grid (i.e., a multiple of 2 for two-tuples), top grid, or bottom grid; 2) alternating sequence for searching grids when the initially-targeted grid is not available: search Down Before Up or Up Before Down; 3) whether to select an active grid over an inactive grid; and 4) whether to replenish an intermediate grid if used while layout is progressing. "Aesthetics" options allow: 1) a single grid, a two-tuple grid, or a three-tuple grid scheme when the schedule is displayed after layout authoring; 2) activity descriptions to be stacked; 3) straight-line D links to be used; and 4) links to be hidden from the network display based on a user-specified gap threshold. Diagram styles include: logic-timeline, logic-step, and activity-on-node. If the latter diagram style is selected, the date criteria that drive object placement along the timeline are activated.

The Thresholds view in the Placement tab provides layout constraints, which for logic-timeline networks include: 1) grid spacing (0.35' is the default); 2) acceptable dimensions/scaling for two zero-gap linked activities to be placed on the same y-grid (e.g., either activity scales≥½ " and both activities scale≥¼"); 3) minimum separation between non-linked activities on the same grid; 4) dimension/scaling along the timeline for the 2nd percentile activity duration≥¼" in increments of ¼"; and 5) maximum width on milestone and benchmark names (e.g., ½" increments, starting at 1"). Default settings are provided for all these constraints.

Figure 14:
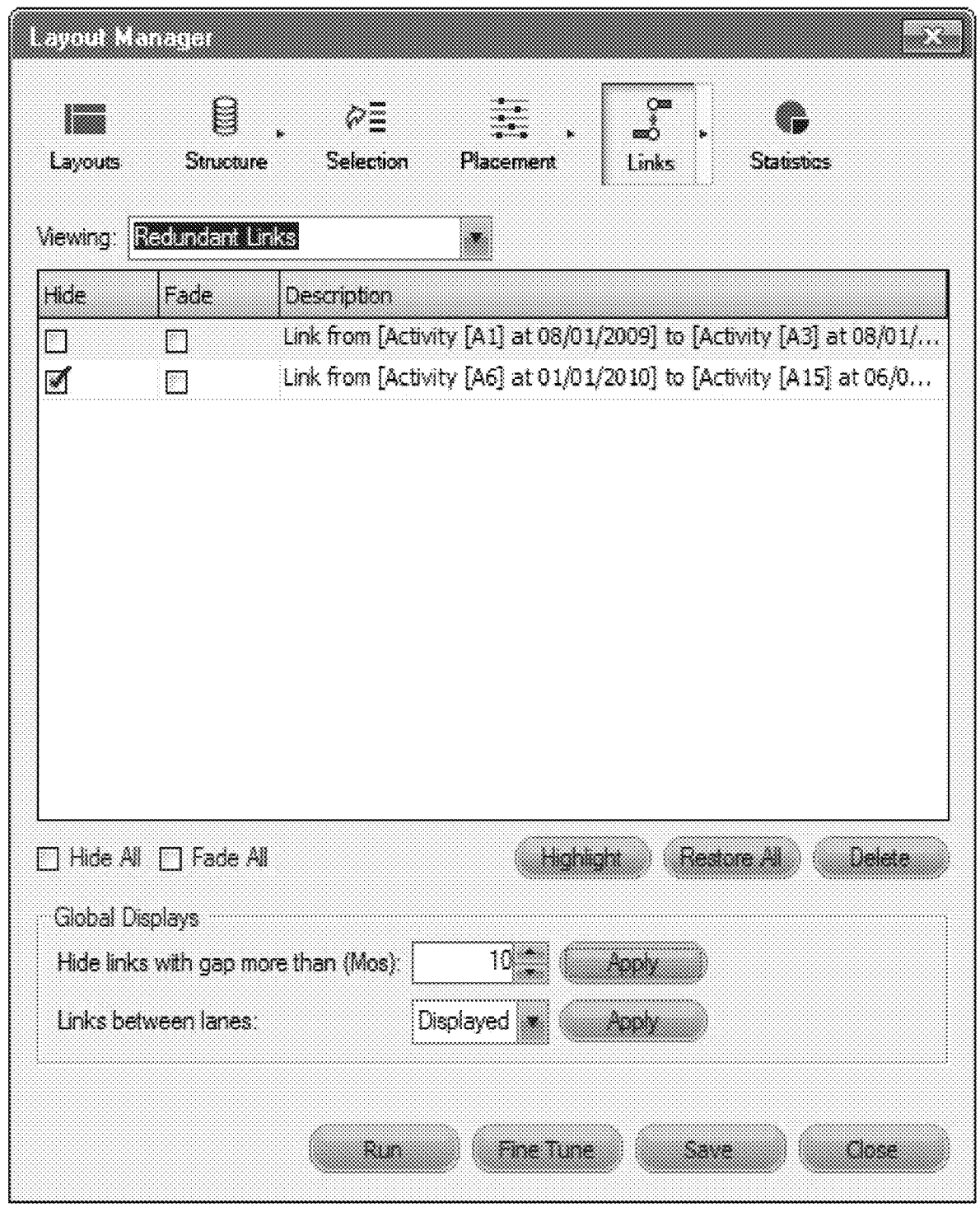
FIG. 14 shows an example of the Layout Manager with the Links view.

FIG. 14 shows an example interface of the Layout Manager with the Links view, and default view, Links. When the Link view is selected, a menu option Viewing is provided at the top of the interface for toggling the subsequent list between redundant and convoluted links. When viewing Redundant Links, checkboxes are provided for omitting (Hide) or fading (Fade) each link from the network display. A Delete button allows any redundant link(s) to be deleted from the network. When viewing Convoluted Links, an input field labeled Filter Out Scores is provided for the user to set the penalty that defines convoluted links. Every link with a link score greater than or equal to this threshold is itemized by listing the predecessor, successor, link type, lag, link shape, and link score. A red square on the display grid indicates a convoluted link. In the example interface, Global displays are provided to allow the user to specify the gap threshold for omitting links and to control the display of links between lanes.

Figure 15:
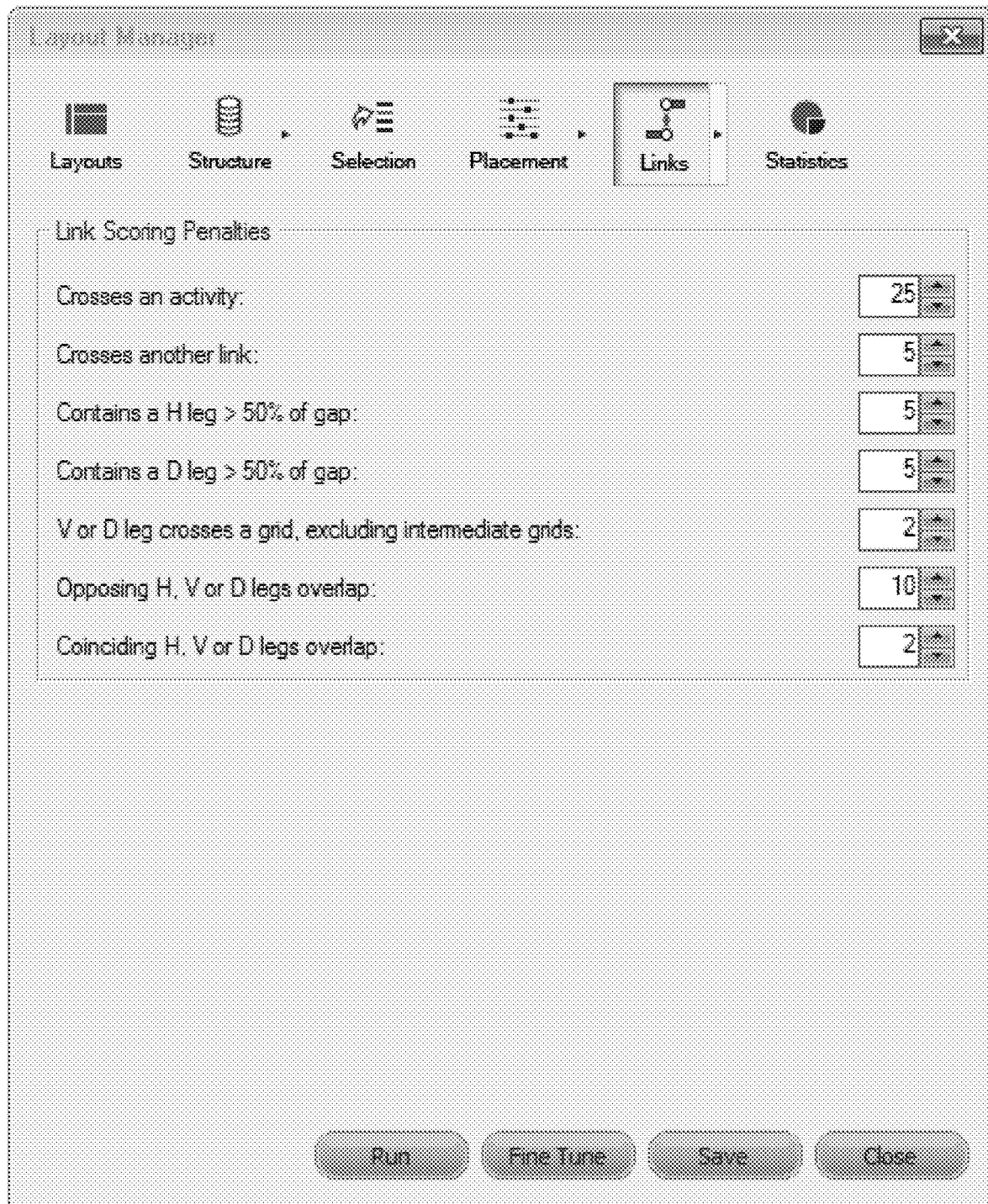
FIG. 15 shows an example of the Layout Manager Penalties interface (Links view).

FIG. 15 shows an example interface of the Layout Manager with the Penalties view, which in the example embodiment provides default values for scoring links for the link routing constraints identified in paragraph 88, and allows user-specified values. Defaults discourage object crossings while favoring shorter links and orthogonal links for positive-gap links in general, except where a D leg precludes a crossing. Because of the preference for orthogonal layouts, as shown in FIG. 14, default Link Penalties assign the highest penalty to link-activity crossings, followed by overlapping link legs running in the opposite direction. Link-link crossings and large gap link H legs and link D legs follow in the penalty hierarchy.

Figure 16:
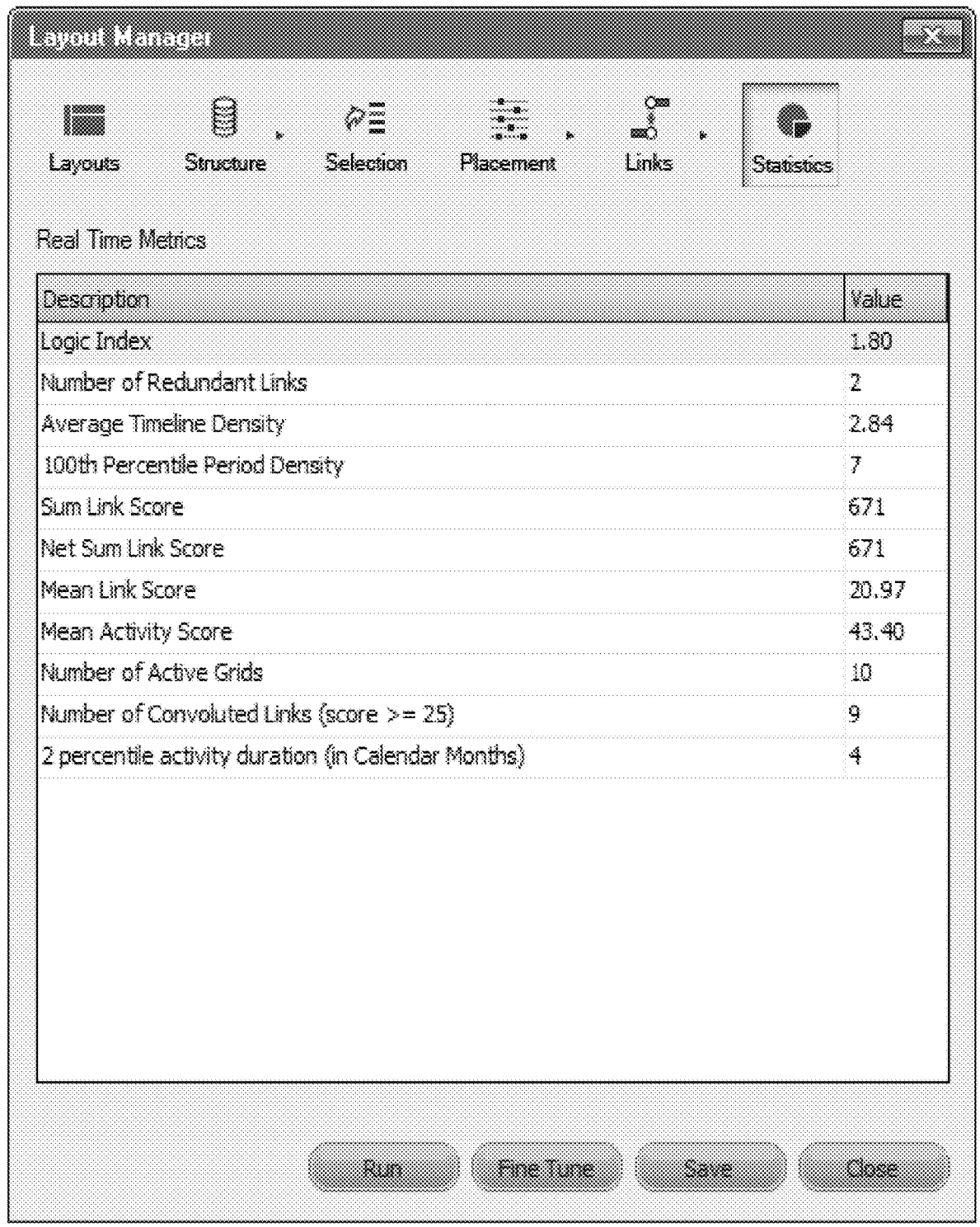
FIG. 16 shows an example interface of the Layout Manager with the Statistics view.

FIG. 16 shows a Layout Manager view for summarizing layout statistics. The example interface itemizes, taking into account only in-progress and remaining activities, the following real-time metrics: logic index; number of redundant links; timeline density and 100th percentile period density; layout score, sum link score, mean link score, and mean activity score; number of active grids for the resulting layout; number of float chains, FS strings, and step chains; number of convoluted links; and the duration of the 2nd percentile activity. The layout score may exceed the sum link score for a manually-authored or an imported schedule due to the potential for object overlaps (i.e., activity-activity, activity-link H leg, etc.). For a layout authored by the NLA application, the layout score is the sum link score as object overlapping other than link overlays is precluded.

Figure 17:
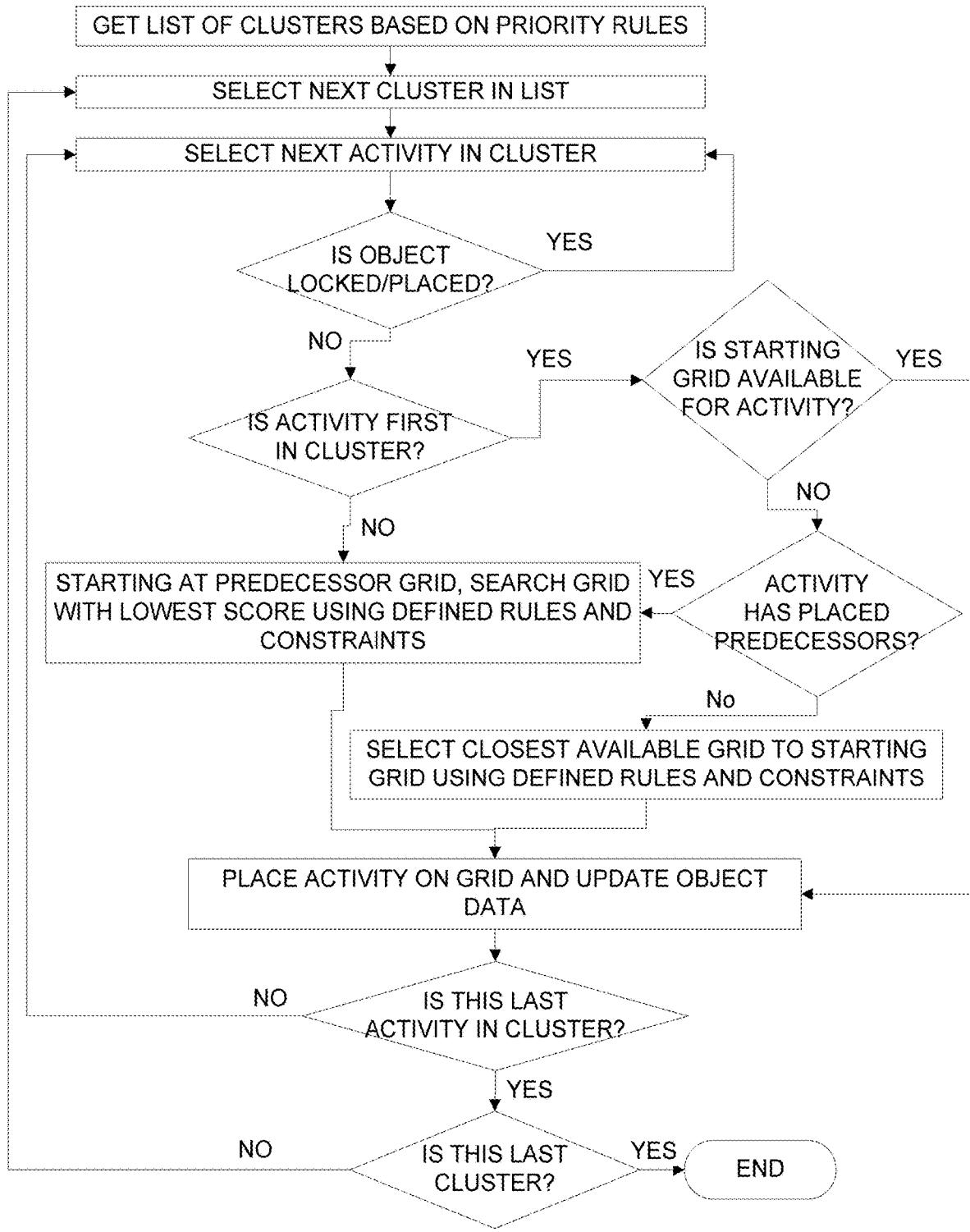
FIG. 17 is a flow chart of an example of the layout engine processor for float chains.

An example of the algorithmic operations that drive base layout processor strategies based on float chains is provided in FIG. 17. The algorithmic operations presented are only provided as one possible interpretation of the automated layout engine. Aspects of the automated layout engine may be implemented as separate components or in combination. The various components may also be grouped in a manner different than that illustrated. Those skilled in the art of constrained graph layout authoring methods should be able to extend the protocols for float chains and derive analogous protocols for FS strings, activities, milestones, and benchmarks.

Figure 18:
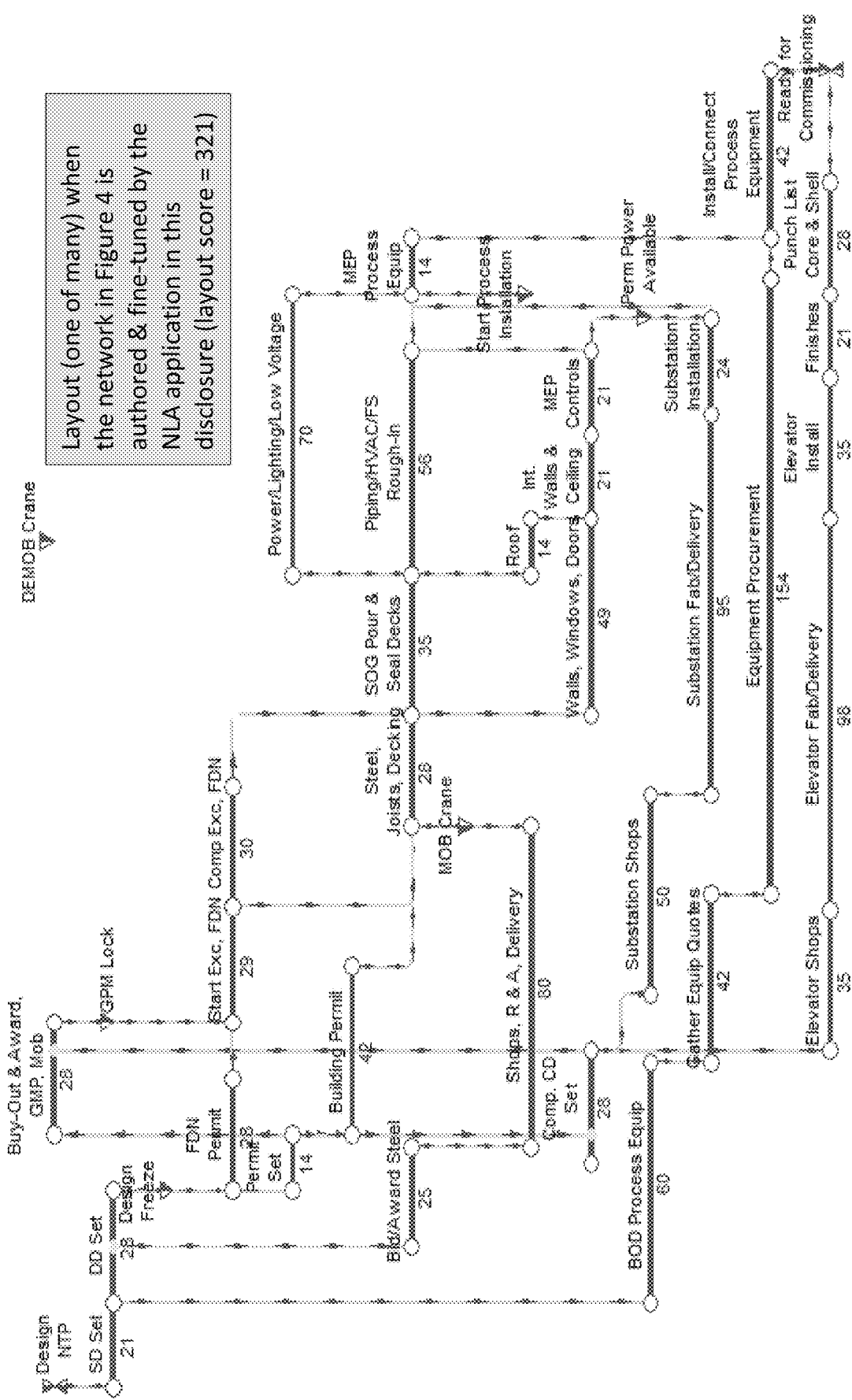
FIGS. 18 and 19 show the network in FIG. 4 as authored by the network layout application and the corresponding Saved Layouts view of the Layout Manager.
Figure 19:
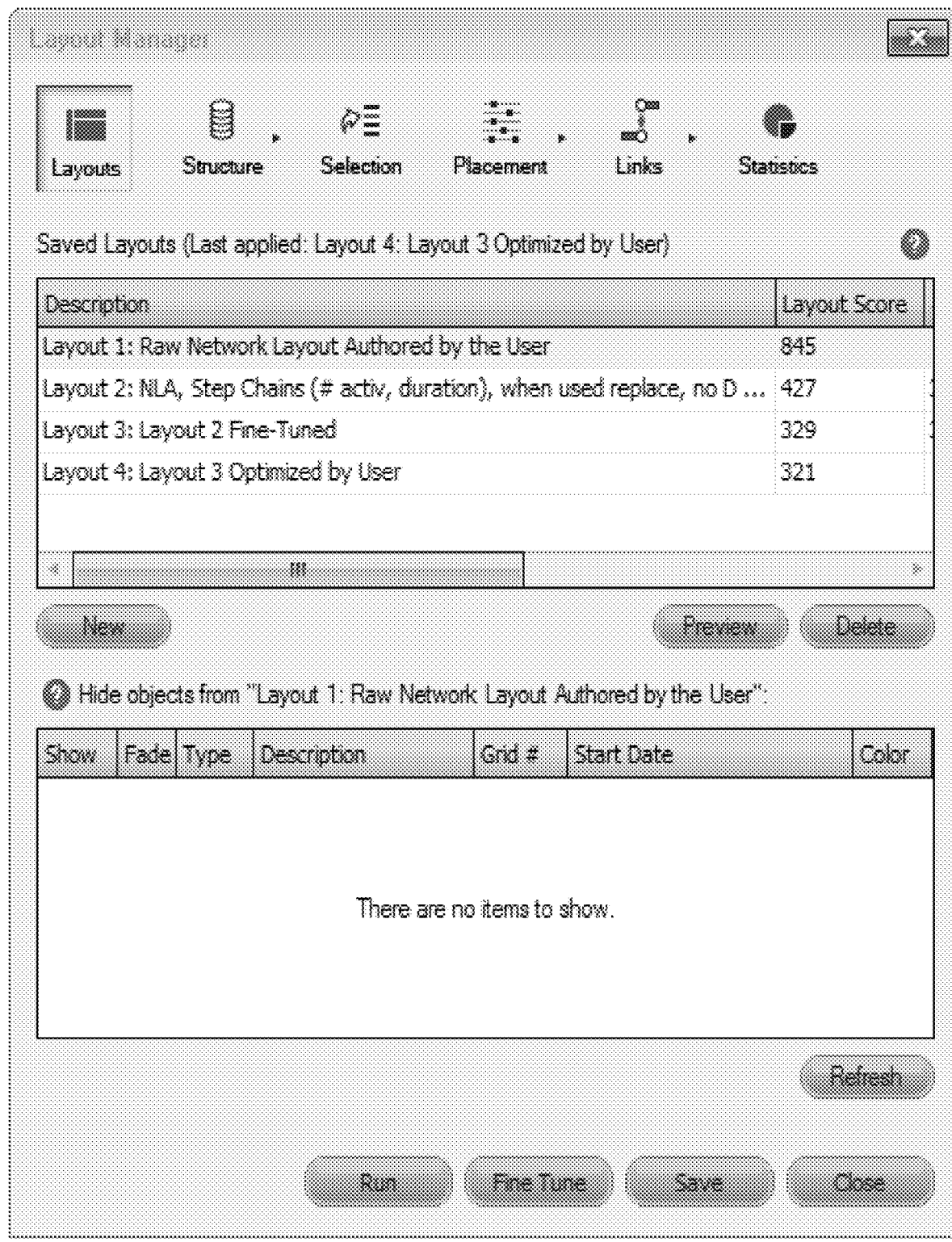

FIGS. 18 and 19 show the NLA application results for the manually-authored network in FIG. 4. As illustrated in the view of the Layout Manager in FIG. 19, using step chains as the primary constraint, the NLA application lowers the layout (sum link) score first, from 845 to 427 by way of a base layout, and, subsequently, to 329 through fine-tuning. At that point in this exercise, the user manually takes over further layout fine-tuning by manipulating objects into slightly improved positions, which lowers the layout score to 321.

Figure 20:
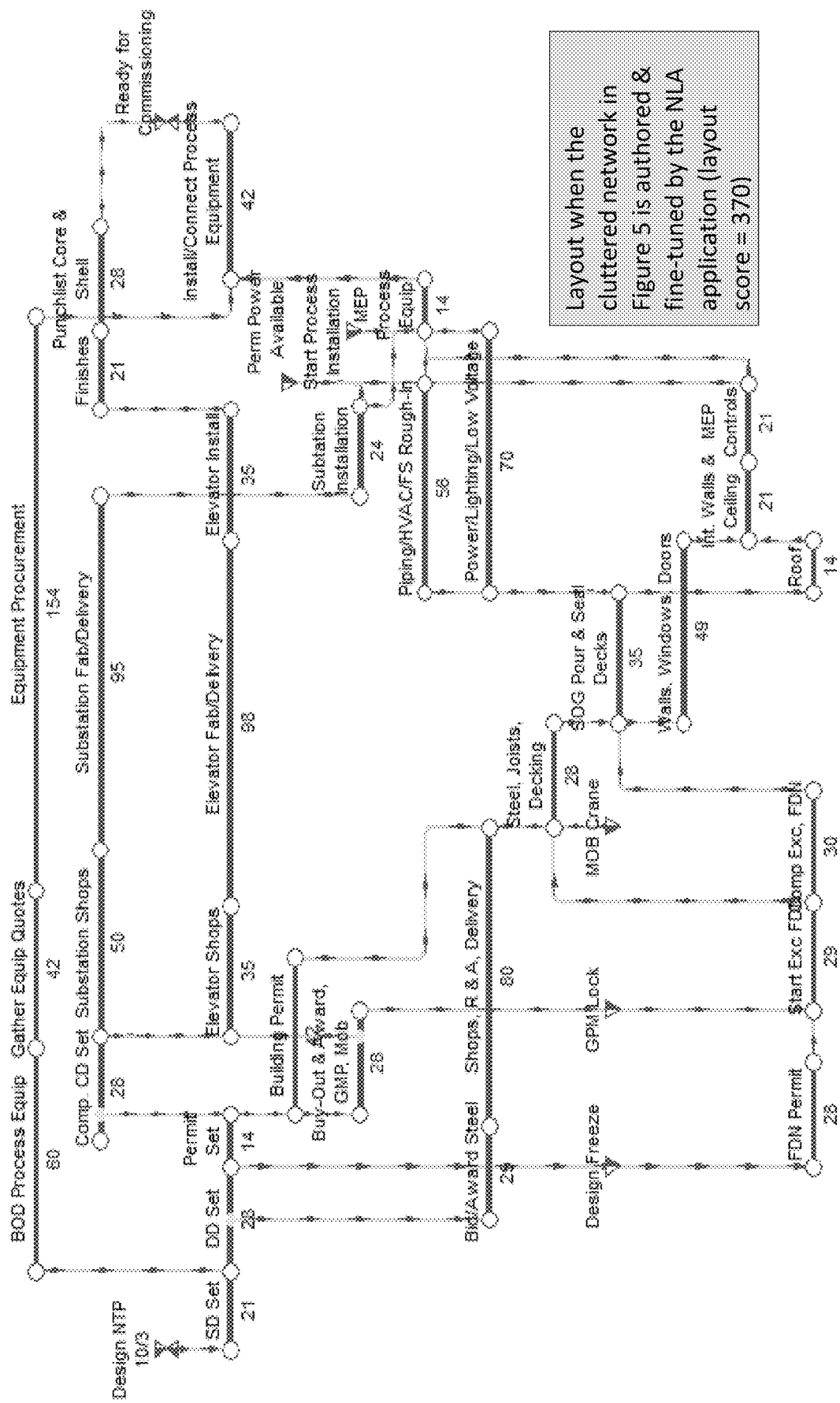
FIGS. 20 and 21 show the network in FIG. 5 as authored by the network layout application and the corresponding Saved Layouts view of the Layout Manager.
Figure 21:
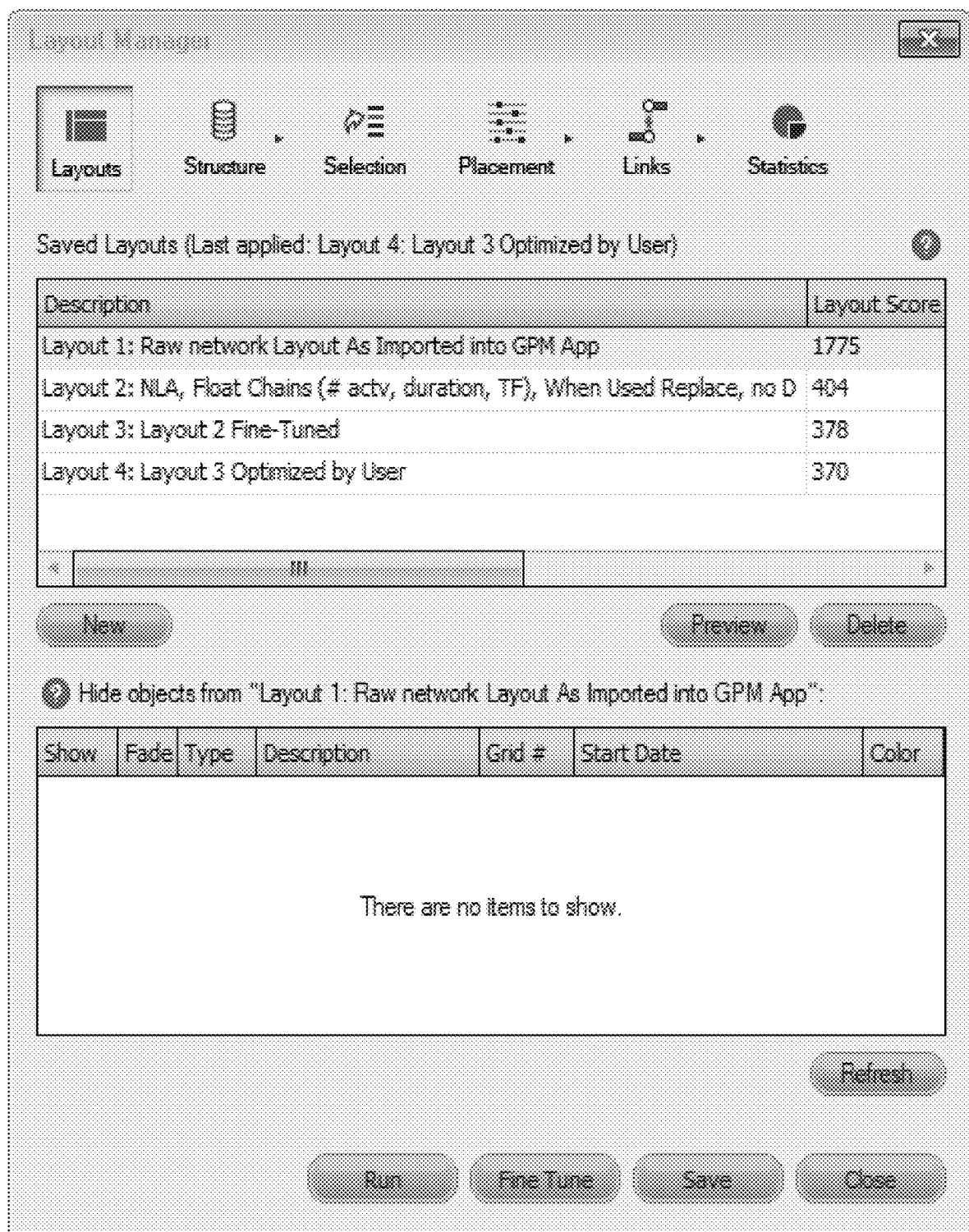

FIGS. 20 and 21 show the NLA application results for the cluttered network in FIG. 5 (imported CPM schedule that is displayed by the GPM® application). In this example, using float chains as the primary constraint, the layout engine first lowers the layout score from 1775 to 404. Fine-tuning of the base layout further lowers the layout score to 378. At that point in this exercise, the user manually takes over further layout fine-tuning by manipulating objects into slightly improved positions, which lowers the layout score to 370.

Figure 7:
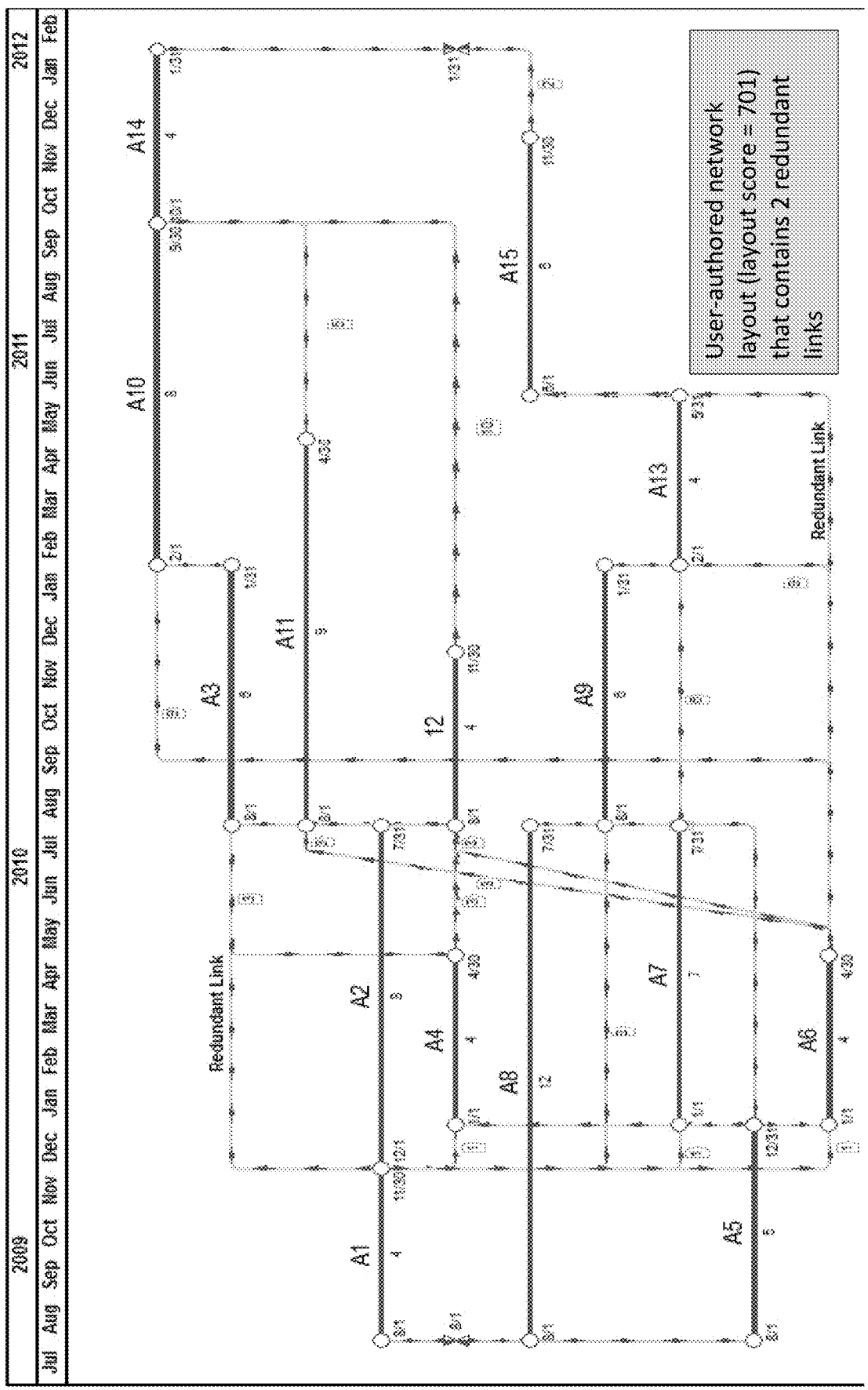
FIG. 7 shows an example logic-timeline network with two redundant links.

The following summarizes layout/sum link score results for the following example networks:

|  | Original Layout | Base Layout by NLA | Fine-Tuned Layout by NLA | Further Layout Authoring by the User |
| --- | --- | --- | --- | --- |
| Manually-authored Network, FIG. 4 | 845 | 427 | 329 | 321 |
| Imported, Cluttered Network, FIG. 5 | 1775 | 404 | 378 | 370 |
| Network with 2 redundant Links, FIG. 7 | 701 | 313 | 287 | 249 |

In a further example embodiment, a button/menu is provided in the toolbar of the GPM® application to run the layout authoring engine on default settings, as designed into the application or as modified by the user. In such automated mode, the network layout authoring application calculates and simulates every possible layout for the entire network (subject to mental mapping constraints) that results from the combination of selection options, and displays the authored network layout that yields the minimum sum link score (with or without redundant links). This automated mode is intended for novice users as well as for well-established schedules where, over the course of the schedule life cycle, a particular search strategy has proven to author a rational network layout.

In a further example, the NLA application may support authoring the layout of scleronomic activity-on-arrow diagrams. Activity-on-arrow is a project networking technique in which 1) straight-line, orthogonal and polyline arrows are used to represent the activities, 2) only FS dependencies are allowed, and 3) FS logic is modeled by combining, or connecting with dummy activities, the finish nodes of activities to their respective successors' start nodes. The application may further export the Y coordinates of the objects and link geometries for plotting by CPM software capable of accepting network-authored X-Y coordinate layouts.

The presented Layout Manager interface and its tabs/views are provided as only one possible interpretation of the interface. The interface may be implemented as separate components or combinations thereof. The various components can also be grouped in a manner different than the example interface.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A computer-implemented method for interactively authoring a layout of a network, the method comprising:
   (a) providing an initial schedule having a network of activities, embedded nodes, milestones, benchmarks, and links between at least a portion of the activities, milestones, and benchmarks, wherein the links are via embedded nodes that are events intermediate of, or right on, start or finish nodes of the activities;
   (b) identifying a plurality of activity clusters from the activities by grouping together ones of the activities that are in a sequence of linked, contiguous activities having a logic chain that has an identical value of at least one of total float, drift, or float for each one of the activities in the sequence; and
   (c) displaying a layout of the initial schedule by placing, as a group, the activities of each of the activity clusters on a display grid upon which the network is laid out, in accordance with location constraints with respect to at least one other network object already placed on the display grid, the location constraints preventing object overlapping and imposing a minimum object spacing, wherein the location constraints further comprise scaling limitations.

2. The method as recited in claim 1, wherein the identical value is total float and the chain includes three or more activities connected by finish-to-start links, in which each intermediate activity in the chain has only one predecessor activity and only one successor activity.

3. The method as recited in claim 1, wherein an order of the placing the activities of each of the activity clusters includes a priority constraint that can be sequenced from high-to-low value or vice-versa.

4. The method as recited in claim 1, wherein the identifying includes identifying the sequence of linked, contiguous activities that comprise a logic chain of activities of consecutive logic steps.

5. The method as recited in claim 1, wherein the identifying includes identifying the sequence of linked, contiguous activities that comprise a logic chain of activities of common filter code.

6. The method as recited in claim 1, wherein the at least one layout constraint includes a location constraint according to a penalty constraint that discourages object crossings, coinciding or opposing link overlays, and link length.

7. The method as recited in claim 1, wherein the network is a rheonomic network.

8. The method as recited in claim 7, wherein the timescale in the display grid automatically adjusts so that small-duration activities are dimensioned for legibility.

9. The method as recited in claim 7, wherein the network converts to a scleronomic network and reverts back to a rheonomic network on demand.

10. The method as recited in claim 1, wherein the network has an initial network layout of a plurality of activities on the display grid at step (a), and the placing at step (c) includes repositioning the activities of at least one of the activity clusters to a location on the display grid, irrespective of the initial network layout.

11. The method as recited in claim 1, wherein the network has an initial network layout of the activities on the display grid at step (a), and the placing at step (c) includes repositioning at least one of the activities to a location on the display grid.

12. The method as recited in claim 1, wherein the network has an initial network layout of the activities on the display grid at step (a), and the placing at step (c) includes repositioning the activities of at least one of the activity clusters to a location on the display grid according to horizontal lanes and a common attribute, irrespective of the initial network layout.

13. The method as recited in claim 12, wherein the common attribute is a user-defined value and the order of the horizontal lanes is a variable.

14. The method as recited in claim 1, wherein the network has an initial network layout of the activities and other network objects on the display grid at step (a), and the placing at step (c) includes repositioning the activities of at least one of the activity clusters to a location on the display grid with respect to a plurality of location-locked activities and/or other objects in the initial network layout.

15. The method as recited in claim 14, wherein location-locked activities and/or other objects are locked based on a user-defined constraint.

16. The method as recited in claim 1, including establishing an aggregate score of the activities and other network objects on the display grid at step (c), the aggregate score including penalties for network object overlap and crossing and for link length on the display grid, and iteratively repositioning on the display grid the activities and other network objects to reduce the aggregate score.

17. The method as recited in claim 1, further including identifying any redundant links, and either omitting the identified redundant links from the display grid or visually indicating the identified redundant links on the display grid.

18. The method as recited in claim 17, wherein, for at least one link connecting an activity A to a successor activity C, selected because activity A and activity C are not on consecutive logic steps, the identifying includes using an algorithm that labels the selected link valid if such link connecting activity A and successor C may mathematically drive the successor C, or redundant instead, if activity C is inevitably driven by another predecessor activity B that is also a successor activity to activity A.

19. The method as recited in claim 18, wherein the algorithm considers finish-to-start, start-to-start, finish-to-finish, and start-to-finish logic for links activity A-activity B, activity A-activity C, and activity B-activity C.

20. The method as recited in claim 18, wherein the algorithm considers logic patterns involving two or more links between two connected activities.

\* \* \* \* \*